US011156253B2

(12) United States Patent
Dutkiewicz

(10) Patent No.: US 11,156,253 B2
(45) Date of Patent: Oct. 26, 2021

(54) PROPELLER SHAFT SLIP MEMBER WITH CRASH COLLAPSE ASSEMBLY

(71) Applicant: DANA AUTOMOTIVE SYSTEMS GROUP, LLC, Maumee, OH (US)

(72) Inventor: Jeffrey A. Dutkiewicz, Ottawa Hills, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 370 days.

(21) Appl. No.: 16/323,811

(22) PCT Filed: Aug. 9, 2017

(86) PCT No.: PCT/US2017/046011
§ 371 (c)(1),
(2) Date: Feb. 7, 2019

(87) PCT Pub. No.: WO2018/031609
PCT Pub. Date: Feb. 15, 2018

(65) Prior Publication Data
US 2019/0211885 A1     Jul. 11, 2019

Related U.S. Application Data

(60) Provisional application No. 62/372,576, filed on Aug. 9, 2016.

(51) Int. Cl.
*F16D 9/04*     (2006.01)
*F16D 3/84*     (2006.01)
(Continued)

(52) U.S. Cl.
CPC ............... *F16D 9/04* (2013.01); *F16D 1/116* (2013.01); *F16D 3/06* (2013.01); *F16D 3/845* (2013.01);
(Continued)

(58) Field of Classification Search
CPC . F16D 9/04; F16D 1/116; F16D 3/848; F16D 3/06; F16D 3/845; F16D 2001/103;
(Continued)

(56) References Cited

U.S. PATENT DOCUMENTS 3,293,884 A    12/1966   Grob
5,903,965 A    5/1999   Fletcher et al.
(Continued)

FOREIGN PATENT DOCUMENTS

CN           10317476 A     6/2013
JP           S5348988 U     4/1978
(Continued)

OTHER PUBLICATIONS

Japanese Patent Office, Office Action issue in Application No. JP2019504888, dated Feb. 12, 2020, 11 pages.
(Continued)

*Primary Examiner* — Greg Binda
(74) *Attorney, Agent, or Firm* — Marshall & Melhorn, LLC

(57) ABSTRACT

A vehicle shaft assembly (500). The shaft assembly includes a coupling assembly having a first (506), a second (508) and a third (510) joint member. A substantially cylindrical body portion of the second joint member is drivingly connected to a first shaft (560) having an increased diameter portion. The increased diameter portion of the first shaft has a retaining member groove (604) circumferentially extending along at least a portion of an outer surface of the increased diameter portion. At least a portion of the increased diameter portion of the first shaft is drivingly connected to a crash collapse adapter (608) having a crash collapse feature circumferentially extending along an inner surface of the crash collapse adapter. A second shaft (640) is integrally connected to at least a portion of an outer surface of the crash collapse
(Continued)

adapter (608). At least a portion of a retaining member is disposed within the retaining member groove and the crash collapse feature.

12 Claims, 9 Drawing Sheets

(51) Int. Cl.
*F16D 1/116* (2006.01)
*F16D 3/06* (2006.01)
*F16D 3/223* (2011.01)
*F16D 1/10* (2006.01)

(52) U.S. Cl.
CPC ........ *F16D 3/848* (2013.01); *F16D 2001/103* (2013.01); *F16D 2003/22313* (2013.01); *Y10S 403/07* (2013.01); *Y10T 403/32475* (2015.01); *Y10T 403/7033* (2015.01)

(58) Field of Classification Search
CPC ........... F16D 2003/22313; F16D 3/227; Y10T 403/7033; Y10T 403/32475; Y10S 403/07
USPC ....................................................... 464/182
See application file for complete search history.

(56) References Cited

U.S. PATENT DOCUMENTS

| 6,015,350 | A | 1/2000 | Breese |
|---|---|---|---|
| 6,390,925 | B1 * | 5/2002 | Perrow ................... F16D 1/112 403/359.1 |
| 6,475,093 | B1 | 11/2002 | Keyes et al. |
| 6,484,684 | B2 | 11/2002 | Moeller et al. |
| 6,648,384 | B2 | 11/2003 | Nees et al. |
| 6,896,623 | B2 | 5/2005 | Creek |
| 6,942,262 | B2 | 9/2005 | Glasgow et al. |
| 6,988,950 | B2 | 1/2006 | Kuczera et al. |
| 7,008,327 | B2 | 3/2006 | Kuczera et al. |
| 7,021,686 | B2 | 4/2006 | Glasgow et al. |
| 7,025,686 | B1 | 4/2006 | Aiken |
| 7,040,991 | B2 | 5/2006 | Kuczera et al. |
| 7,077,753 | B2 | 7/2006 | Kuczera et al. |
| 7,240,933 | B2 | 7/2007 | Glasgow et al. |
| 7,288,029 | B1 | 10/2007 | Lyon et al. |
| 9,303,695 | B2 | 4/2016 | Choi et al. |
| 9,316,264 | B2 | 4/2016 | Choi |
| 2004/0157670 | A1 | 8/2004 | Lyon et al. |
| 2007/0129154 | A1 | 6/2007 | Valovick |
| 2017/0067503 | A1 | 3/2017 | Yoo et al. |

FOREIGN PATENT DOCUMENTS

| JP | H08254222 A | 10/1996 |
|---|---|---|
| JP | 2004257536 A | 9/2004 |
| JP | 2006322516 A | 11/2006 |
| JP | 2007078105 A | 3/2007 |
| JP | 2012001061 A | 1/2012 |
| JP | 2013043581 A | 3/2013 |
| JP | 2013064422 A | 4/2013 |
| JP | 2014020404 A | 2/2014 |
| JP | 2015102158 A | 6/2015 |
| WO | 2008/031738 A1 | 3/2008 |

OTHER PUBLICATIONS

European Patent Office, International Search Report with Written Opinion, issued in PCT/US2017/046011, dated Oct. 12, 2017, 13 pages, European Patent Office, Rijswijk, Netherlands.

* cited by examiner

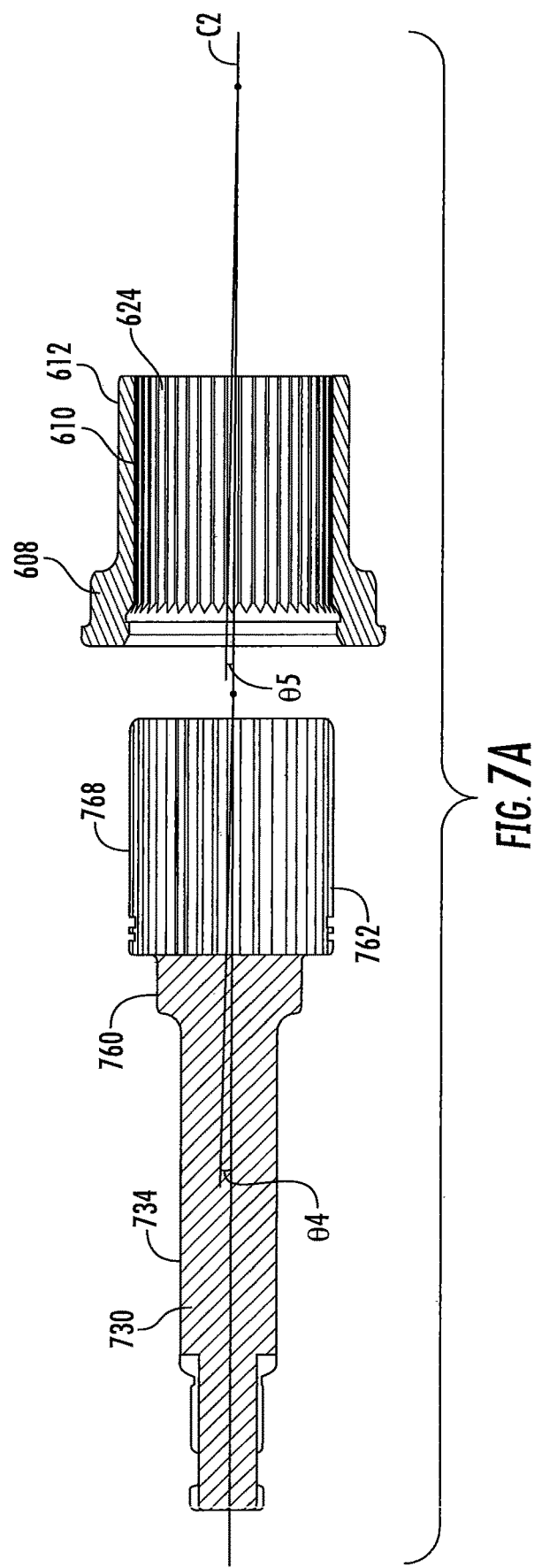

PROPELLER SHAFT SLIP MEMBER WITH CRASH COLLAPSE ASSEMBLY

CROSS REFERENCE TO RELATED APPLICATIONS

The present application is the National Stage of International Application No. PCT/US2017/046011, filed Aug. 9, 2017, which claims the benefit of U.S. Provisional Patent Application No. 62/372,576, filed on Aug. 9, 2016, which is incorporated herein by reference in its entirety.

FIELD OF THE DISCLOSURE

The present disclosure relates to a propeller shaft assembly having a slip member with a crash collapse assembly.

BACKGROUND OF THE DISCLOSURE

Many vehicles utilize one or more propeller shaft assemblies to transfer the rotational energy generated by a motor of a vehicle to one or more axle assemblies. It is well known within the industry to use one or more propeller shaft assemblies to transmit the rotational energy of the motor to the one or more axle assemblies of the vehicle when the distance between the axle assemblies or the distance between the motor and the axle assemblies is relatively large. In order to transmit the torque from one shaft to another, the propeller shaft assemblies incorporate the use of one or more constant velocity joints or universal joint assemblies. The constant velocity joints or universal joints allow one shaft to transmit torque to another shaft when the shafts are non-coaxial or at least one of the shafts have a variable angle when in operation.

The problem with many conventional propeller shaft assemblies is that when the vehicle is in an accident, the propeller shaft(s) buckle and penetrate the passenger compartment of a vehicle injuring the passenger(s). Additionally, as a result of the force(s) transmitted through the propeller shaft assembly in crash situations, the propeller shaft(s) tend to cause damage to other vehicle components that are in close proximity to or are connected to the propeller shaft assembly. It would therefore be advantageous to create a safer propeller shaft assembly that is capable of absorbing at least a portion of the force(s) generated during the crash without injuring passenger(s), buckling and/or damaging nearby vehicle components. Additionally, it would be advantageous to create a propeller shaft assembly that incorporates the use of a customizable crash collapse assembly.

SUMMARY OF THE DISCLOSURE

A shaft assembly having a crash collapse assembly for use in a vehicle. The shaft assembly includes a coupling assembly having a first joint member, a second joint member and a third joint member drivingly connecting the first joint member to the second joint member. The second joint member has a first end portion, a second end portion and an intermediate portion interposed between the first and second end portions of the second joint member. Extending from at least a portion of the intermediate portion of the second joint member is a substantially cylindrical body portion.

At least a portion of a first shaft is drivingly connected to at least a portion of the substantially cylindrical body portion of the second joint member. The first shaft has a first end portion a second end portion and an intermediate portion interposed between the first and second end portions of the first shaft. Extending from at least a portion of the second end portion of the first shaft is an increased diameter portion having a plurality of axially extending increased diameter portion splines. A retaining member groove circumferentially extending along at least a portion of an outer surface of the increased diameter portion of the first shaft.

Connected to at least a portion of the increased diameter portion of the first shaft is a crash collapse adapter having an inner surface and an outer surface defining a hollow portion therein. A plurality of axially extending crash collapse adapter splines circumferentially extend from at least a portion of the inner surface of the crash collapse adapter. The plurality of axially extending crash collapse adapter splines are complementary to and meshingly engaged with the plurality of axially extending increased diameter portion splines on the first shaft. A crash collapse feature circumferentially extending along at least a portion of the inner surface of the crash collapse adapter. The crash collapse adapter includes a first decreasing diameter portion, a substantially cylindrical portion, an increased diameter portion and a second decreasing diameter portion.

At least a portion of a retaining member is disposed within the retaining member groove in the outer surface of the increased diameter portion of the first shaft and the increased diameter portion of the crash collapse feature in the inner surface of the crash collapse adapter. Upon the application of a pre-determined amount of force onto the retaining member, the retaining member radially collapses into the retaining member groove in the outer surface of the increased diameter portion of the first shaft.

Integrally connected to at least a portion of the crash collapse adapter is a first end portion of a second shaft.

BRIEF DESCRIPTION OF THE FIGURES

The above, as well as other advantages of the present disclosure, will become readily apparent to those skilled in the art from the following detailed description when considered in light of the accompanying drawings in which:

FIG. 7A is a partial cut-away schematic side-view of a portion of a crash collapse assembly according to an embodiment of the disclosure.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the shaft assembly disclosed herein may be used in automotive, off-road vehicle, all-terrain vehicle, construction, structural, marine, aerospace, locomotive, military, machinery, robotic and/or consumer product applications. Additionally, as a non-limiting example, the shaft assembly disclosed herein may also be used in passenger vehicle, electric vehicle, hybrid vehicle, commercial vehicle, autonomous vehicles, semi-autonomous vehicles and/or heavy vehicle applications.

Figure 1:
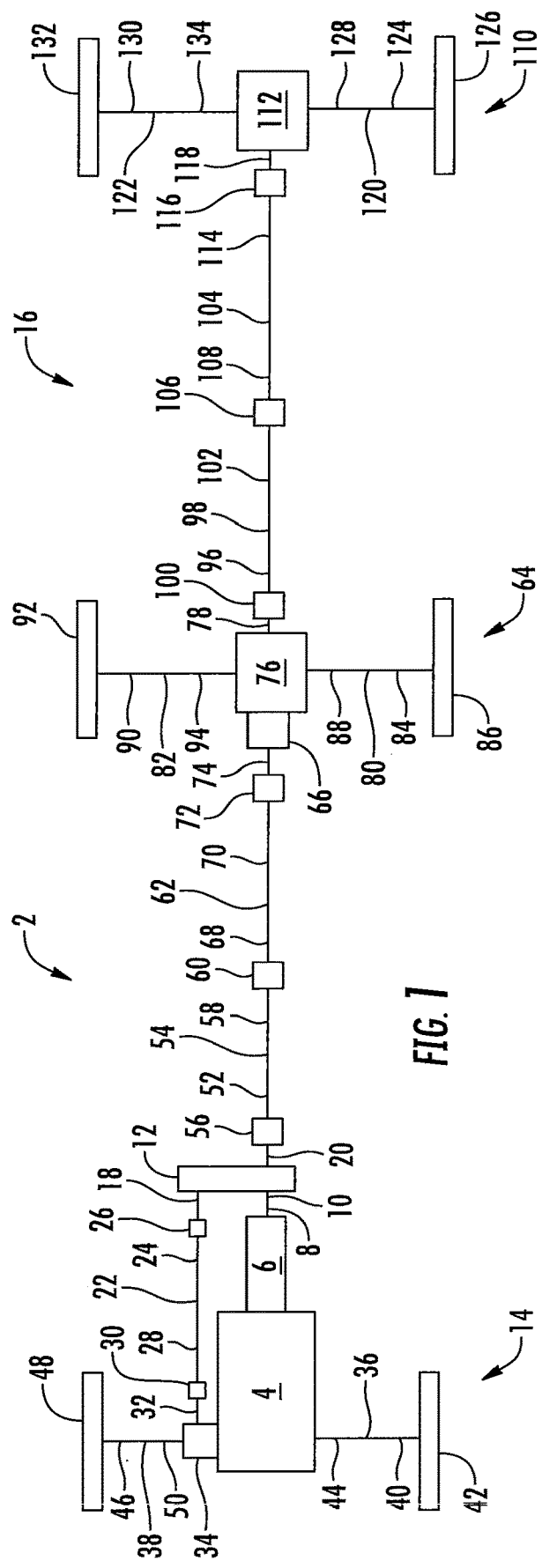
FIG. 1 is a schematic top-plan view of a vehicle having one or more shaft assemblies according to an embodiment of the disclosure.

FIG. 1 is a schematic top-plan view of a vehicle 2 having one or more shaft assemblies according to an embodiment of the disclosure. The vehicle 2 has an engine 4 which is drivingly connected to a transmission 6. A transmission output shaft 8 is then drivingly connected to an end of the transmission 6 opposite the engine 4. The transmission 6 is a power management system which provides controlled application of the rotational energy generated by the engine 4 by means of a gearbox.

The transmission output shaft 8 is drivingly connected to a transfer case input shaft 10 which in turn is drivingly connected to a transfer case 12. The transfer case 12 is used to transfer the rotational power from the transmission 6 to a front axle system 14 and a tandem axle system 16 by utilizing a series of gears and drive shafts. The transfer case 12 includes a first transfer case output 18 shaft and a second transfer case output shaft 20.

A first propeller shaft 22 extends from the first transfer case output shaft 18 to the front axle system 14 of the vehicle 2. A first end portion 24 of the first propeller shaft 22 is drivingly connected to an end of the first transfer case output shaft 18 opposite the transfer case 12 via a first coupling assembly 26. As a non-limiting example, the first coupling assembly 26 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure, that the first coupling assembly 26 may be drivingly connected to the first end portion 24 of the first propeller shaft 22 by using a crash collapse assembly according to an embodiment of the disclosure.

As illustrated in FIG. 1 of the disclosure, second end portion 28 of the first propeller shaft 22 is drivingly connected to a second coupling assembly 30. As a non-limiting example, the second coupling assembly 30 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the second coupling assembly 30 may be drivingly connected to the second end portion 28 of the first propeller shaft 22 by using a crash collapse assembly according to an embodiment of the disclosure.

Drivingly connected to an end of the second coupling assembly 30 is an end of a front axle system input shaft 32. As a non-limiting example, the front axle system input shaft 32 is a front axle differential input shaft, a coupling shaft, stub shaft or a front axle differential pinion shaft. Drivingly connected to an end of the front axle system input shaft 32 opposite the first propeller shaft 22 is a front axle differential 34. The front axle differential 34 is a set of gears that allows the outer drive wheel(s) of the wheeled vehicle to rotate at a faster rate that the inner drive wheel(s). The rotational power is transmitted through the front axle system 14 as described in more detail below.

The front axle system 14 further includes a first front axle half shaft 36 and a second front axle half shaft 38. The first front axle half shaft 36 extends substantially perpendicular to the front axle system input shaft 32. A first end portion 40 of the first front axle half shaft 36 is drivingly connected to a first front axle wheel assembly 42 and a second end portion 44 of the first front axle half shaft 36 is drivingly connected to an end of the front axle differential 34. As a non-limiting example, the second end portion 44 of the first front axle half shaft 36 is drivingly connected to a front axle differential side gear, a separate stub shaft, a separate coupling shaft, a first front axle differential output shaft and/or a shaft that is formed as part of a front axle differential side gear.

Extending substantially perpendicular to the front axle system input shaft 32 is the second front axle half shaft 38. A first end portion 46 of the second front axle half shaft 38 is drivingly connected to a second front axle wheel assembly 48. A second end portion 50 of the second front axle half shaft 38 is drivingly connected to an end of the front axle differential 34 opposite the first front axle half shaft 36. As a non-limiting example, the second end portion 50 of the second front axle half shaft 38 is drivingly connected to a front axle differential side gear, a separate stub shaft, a separate coupling shaft, a second front axle differential output shaft and/or a shaft that is formed as part of a front axle differential side gear.

An end of the second transfer case output shaft 20 is drivingly connected to an end of the transfer case 12 opposite the transfer case input shaft 10. As illustrated in FIG. 1 of the disclosure, a first end portion 52 of a second propeller shaft 54 is drivingly connected to an end of the second transfer case output shaft 20 opposite the transfer case 12 via a third coupling assembly 56. As non-limiting example, the third coupling assembly 56 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the third coupling assembly may be drivingly connected to the first end portion 52 of the second propeller shaft 54 by using a crash collapse assembly according to an embodiment of the disclosure.

As illustrated in FIG. 1 of the disclosure, a second end portion 58 of the second propeller shaft 54 is drivingly connected to a fourth coupling assembly 60. As a non-limiting example, the fourth coupling assembly 60 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the fourth coupling assembly 60 may be drivingly connected to the second end portion 58 of the second propeller shaft 54 by using a crash collapse assembly according to an embodiment of the disclosure.

Drivingly connected to an end of the fourth coupling assembly 60, opposite the second propeller shaft 54, is a third propeller shaft 62. The third propeller shaft 62 drivingly connects the transfer case 12 to a forward tandem axle system 64 of the tandem axle system 16 having an inter-axle differential 66. As illustrated in FIG. 1 of the disclosure, a first end portion 68 of the third propeller shaft 62 is drivingly connected to an end of the fourth coupling assembly 60 opposite the second propeller shaft 54. It is within the scope of this disclosure that the fourth coupling assembly 60 may drivingly connected to the third propeller shaft 62 by using a crash collapse assembly according to an embodiment of the disclosure.

A second end portion 70 of the third propeller shaft 62 is drivingly connected to an end of a fifth coupling assembly 72. As a non-limiting example, the fifth coupling assembly 72 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the fifth coupling assembly 72 may be drivingly connected to the second end portion 70 of the third propeller shaft 62 by using a crash collapse assembly according to an embodiment of the disclosure.

Drivingly connected to an end of the fifth coupling assembly 72, opposite the third propeller shaft 62, is an end of a forward tandem axle system input shaft 74. An end of the forward tandem axle system input shaft 74, opposite the third propeller shaft 62, is drivingly connected to the inter-axle differential 66 of the forward tandem axle system 64. As a non-limiting example, the forward tandem axle system input shaft 74 is an inter-axle differential input shaft, a coupling shaft, stub shaft or an inter-axle differential pinion shaft. The inter-axle differential 66 is a device that divides the rotational power generated by the engine 4 between the axles in a vehicle 2. The rotational power is transmitted through the forward tandem axle system 64 as described in more detail below.

As illustrated in FIG. 1 of the disclosure, the inter-axle differential 66 is drivingly connected to a forward tandem axle differential 76 and a forward tandem axle system output shaft 78. The forward tandem axle differential 76 is a set of gears that allows the outer drive wheel(s) of a wheeled vehicle to rotate at a faster rate than the inner drive wheel(s).

The forward tandem axle system 64 further includes a first forward tandem axle half shaft 80 and a second forward tandem axle half shaft 82. The first forward tandem axle half shaft 80 extends substantially perpendicular to the forward tandem axle system input shaft 74. A first end portion 84 of the first forward tandem axle half shaft 80 is drivingly connected to a first forward tandem axle wheel assembly 86 and a second end portion 88 of the first forward tandem axle half shaft 80 is drivingly connected to an end of the forward tandem axle differential 76. As a non-limiting example, the second end portion 88 of the first forward tandem axle half shaft 80 is drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the forward tandem axle input shaft 74 is the second forward tandem axle half shaft 82. A first end portion 90 of the second forward tandem axle half shaft 82 is drivingly connected to a second forward tandem axle wheel assembly 92. A second end portion 94 of the second forward tandem axle half shaft 82 is drivingly connected to an end of the forward tandem axle differential 76 opposite the first forward tandem axle half shaft 80. As a non-limiting example, the second end portion 94 of the second forward tandem axle half shaft 82 is drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 78 is drivingly connected to a side of the inter-axle differential 66 opposite the third propeller shaft 62. An end of the forward tandem axle system output shaft 78, opposite the inter-axle differential 66, is drivingly connected to a first end portion 96 of a fourth propeller shaft 98 via a sixth coupling assembly 100. As a non-limiting example, the sixth coupling assembly 100 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the sixth coupling assembly 100 may be drivingly connected to the first end portion 96 of the fourth propeller shaft 98 by using a crash collapse assembly according to an embodiment of the disclosure.

A second end portion 102 of the fourth propeller shaft 98 is drivingly connected to a fifth propeller shaft 104 via a seventh coupling assembly 106. As a non-limiting example, the seventh coupling assembly 106 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the seventh coupling assembly 106 may be drivingly connected to the second end portion 102 of the fourth propeller shaft 98 by using a crash collapse assembly according to an embodiment of the disclosure.

As illustrated in FIG. 1 of the disclosure, a first end portion 108 of the fifth propeller shaft 104 is drivingly connected to an end of the seventh coupling assembly 106. The fifth propeller shaft 104 drivingly connects the inter-axle differential 66 to a rear tandem axle system 110 having a rear tandem axle differential 112. It is within the scope of this disclosure that the seventh coupling assembly 106 may be drivingly connected to the first end portion 108 of the fifth propeller shaft 104 by using a crash collapse assembly according to an embodiment of the disclosure.

Additionally, as illustrated in FIG. 1 of the disclosure, a second end portion 114 of the fifth propeller shaft 104 is drivingly connected to an end of an eighth coupling assembly 116. As a non-limiting example, the eighth coupling assembly 116 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the eighth coupling assembly 116 may be drivingly connected to the second end portion 114 of the fifth propeller shaft 104 by using a crash collapse assembly according to an embodiment of the disclosure.

Drivingly connected to an end of the eighth coupling assembly 116, opposite the fifth propeller shaft 104, is an end of a rear tandem axle system input shaft 118. As a non-limiting example, the rear tandem axle input shaft 118 is a rear tandem axle differential input shaft, a coupling shaft, stub shaft or a rear tandem axle differential pinion shaft. Drivingly connected to an end of the rear tandem axle input shaft 118, opposite the fifth propeller shaft 104, is the rear tandem axle differential 112. The rear tandem axle differential 112 is a set of gears that allows the outer drive wheel(s) of the wheeled vehicle to rotate at a faster rate that the inner drive wheel(s). The rotational power is transmitted through the rear tandem axle system 110 as described in more detail below.

The rear tandem axle system 110 further includes a first rear tandem axle half shaft 120 and a second rear tandem axle half shaft 122. The first rear tandem axle half shaft 120 extends substantially perpendicular to the rear tandem axle system input shaft 118. A first end portion 124 of the first rear tandem axle half shaft 120 is drivingly connected to a first rear tandem axle wheel assembly 126 and a second end portion 128 of the first rear tandem axle half shaft 120 is drivingly connected to an end of the rear tandem axle differential 112. As a non-limiting example, the second end portion 128 of the first rear tandem axle half shaft 120 is drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle system input shaft 118 is the second forward tandem axle half shaft 122. A first end portion 130 of the second rear tandem axle half shaft 122 is drivingly connected to a second rear tandem axle wheel assembly 132. A second end portion 134 of the second rear tandem axle half shaft 122 is drivingly connected to an end of the rear tandem axle differential 122 opposite the first rear tandem axle half shaft 120. As a non-limiting example, the second end portion 134 of the second rear tandem axle half shaft 122 is drivingly connected to a rear tandem axle differential side gear, a separate stub shaft, a separate coupling shaft, a second rear tandem axle differential output shaft and/or a shaft that is formed as part of a rear tandem axle differential side gear.

Figure 2:
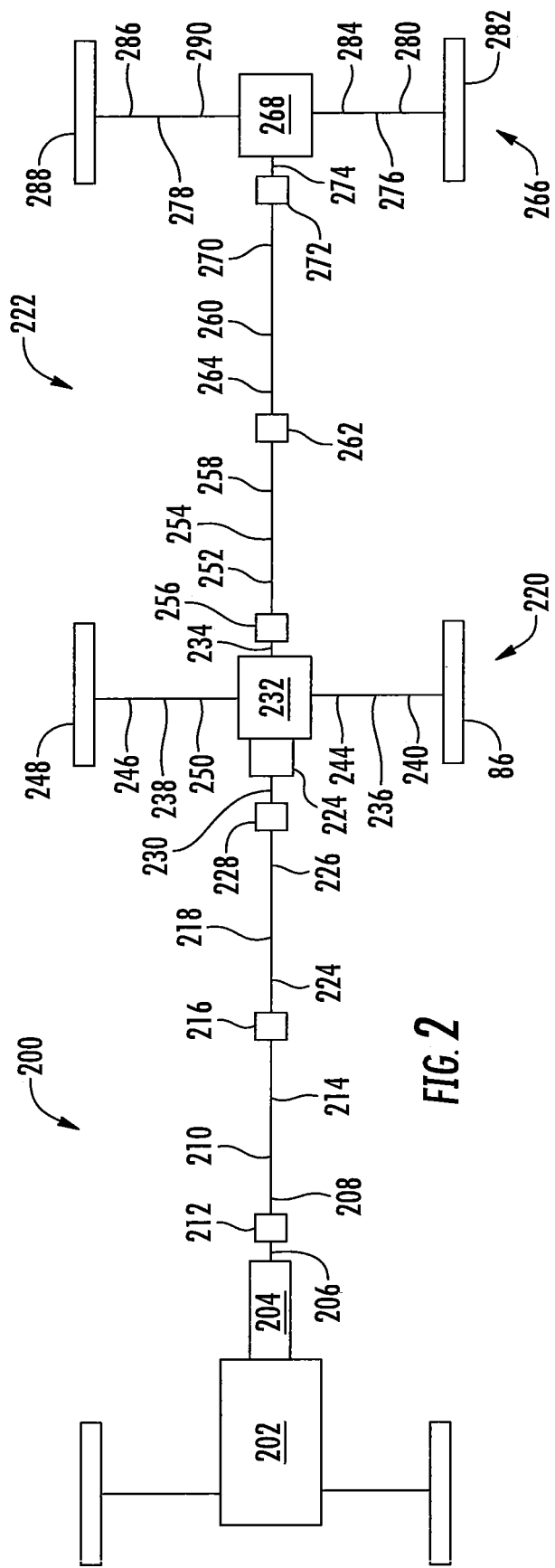
FIG. 2 is a schematic top-plan view of another vehicle having one or more shaft assemblies according to an embodiment of the disclosure.

FIG. 2 is a schematic top-plan view of a vehicle 200 having one or more shaft assemblies according to an embodiment of the disclosure. The vehicle 200 has an engine 202 which is drivingly connected to a transmission 204. A transmission output shaft 206 is drivingly connected to an end of the transmission 204 opposite the engine 202. The transmission 204 is a power management system which provides controlled application of the rotational power generated by the engine by means of a gear box.

A first end portion 208 of a first propeller shaft 210 is drivingly connected to an end of the transmission output shaft 206 opposite the transmission 204 via a first coupling assembly 212. As a non-limiting example, the first coupling assembly 212 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the first coupling assembly 212 may be drivingly connected to the first end portion 208 of the first propeller shaft 210 by using a crash collapse assembly according to an embodiment of the disclosure.

As illustrated in FIG. 2 of the disclosure, a second end portion 214 of the first propeller shaft 210 is drivingly connected to a second coupling assembly 216. As a non-limiting example, the second coupling assembly 216 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that second coupling assembly 216 may be drivingly connected to the second end portion 214 of the first propeller shaft 210 by using a crash collapse assembly according to an embodiment of the disclosure.

Drivingly connected to an end of the second coupling assembly 216, opposite the first propeller shaft 210, is a second propeller shaft 218. The second propeller shaft 218 drivingly connects the transmission 204 to a forward tandem axle system 220 of a tandem axle system 222 having an inter-axle differential 224. As illustrated in FIG. 2 of the disclosure, a first end portion 224 of the second propeller shaft 218 is drivingly connected to an end of the second coupling assembly 216 opposite the first propeller shaft 210. It is within the scope of this disclosure that the second coupling assembly 216 may be drivingly connected to the first end portion 224 of the second propeller shaft 218 by using a crash collapse assembly according to an embodiment of the disclosure.

A second end portion 226 of the second propeller shaft 218 is drivingly connected to an end of a third coupling assembly 228. As a non-limiting example, the third coupling assembly 228 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the third coupling assembly 228 may be drivingly connected to the second end portion 226 of the second propeller shaft 218 by using a crash collapse assembly according to an embodiment of the disclosure.

Drivingly connected to an end of the third coupling assembly 228, opposite the second propeller shaft 218, is an end of a forward tandem axle system input shaft 230. An end of the forward tandem axle system input shaft 230, opposite the second propeller shaft 218, is drivingly connected to the inter-axle differential 224 of the forward tandem axle system 220. As a non-limiting example, the forward tandem axle system input shaft 230 is an inter-axle differential input shaft, a coupling shaft, stub shaft or an inter-axle differential pinion shaft. The inter-axle differential 224 is a device that divides the rotational power generated by the engine 204 between the axles in a vehicle 200. The rotational power is transmitted through the forward tandem axle system 220 as described in more detail below.

As illustrated in FIG. 2 of the disclosure, the inter-axle differential 224 is drivingly connected to a forward tandem axle differential 232 and a forward tandem axle system output shaft 234. The forward tandem axle differential 232 is a set of gears that allows the outer drive wheel(s) of a wheeled vehicle to rotate at a faster rate than the inner drive wheel(s).

The forward tandem axle system 220 further includes a first forward tandem axle half shaft 236 and a second front tandem axle half shaft 238. The first forward tandem axle half shaft 236 extends substantially perpendicular to the forward tandem axle system input shaft 230. A first end portion 240 of the first forward tandem axle half shaft 236 is drivingly connected to a first forward tandem axle wheel assembly 242 and a second end portion 244 of the first forward tandem axle half shaft 236 is drivingly connected to an end of the forward tandem axle differential 232. As a non-limiting example, the second end portion 244 of the first forward tandem axle half shaft 236 is drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the forward tandem axle input shaft 230 is the second front tandem axle half shaft 238. A first end portion 246 of the second forward tandem axle half shaft 238 is drivingly connected to a second forward tandem axle wheel assembly 248. A second end portion 250 of the second forward tandem axle half shaft 238 is drivingly connected to an end of the forward tandem axle differential 232 opposite the first forward tandem axle half shaft 236. As a non-limiting example, the second end portion 250 of the second forward tandem axle half shaft 238 is drivingly connected to a forward tandem axle differential side gear, a separate stub shaft, a separate coupling shaft, a second forward tandem axle differential output shaft and/or a shaft that is formed as part of a forward tandem axle differential side gear. One end of the forward tandem axle system output shaft 234 is drivingly connected to a side of the inter-axle differential 224 opposite the second propeller shaft 218. An end of the forward tandem axle system output shaft 234, opposite the inter-axle differential 224, is drivingly connected to a first end portion 252 of a third propeller shaft 254 via a fourth coupling assembly 256. As a non-limiting example, the fourth coupling assembly 256 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the fourth coupling assembly 256 may be drivingly connected to at least a portion of the first end portion 252 of a third propeller shaft 254 by using a crash collapse assembly according to an embodiment of the disclosure.

A second end portion 258 of the third propeller shaft 254 is drivingly connected to a fourth propeller shaft 260 via a fifth coupling assembly 262. As a non-limiting example, the fifth coupling assembly 262 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the fifth coupling assembly 262 may be drivingly connected to the second end portion 258 of the third propeller shaft 254 by using a crash collapse assembly according to an embodiment of the disclosure.

As illustrated in FIG. 2 of the disclosure, a first end portion 264 of the fourth propeller shaft 260 is drivingly connected to an end of the fifth coupling assembly 262. The fourth propeller shaft 260 drivingly connects the inter-axle differential 224 to a rear tandem axle system 266 having a rear tandem axle differential 268. It is within the scope of this disclosure that the fifth coupling assembly 262 may be drivingly connected to the first end portion 264 of the fourth propeller shaft 260 by using a crash collapse assembly according to an embodiment of the disclosure.

Additionally, as illustrated in FIG. 2 of the disclosure, a second end portion 270 of the fourth propeller shaft 260 is drivingly connected to an end of an sixth coupling assembly 272. As a non-limiting example, the sixth coupling assembly 272 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the sixth coupling assembly 272 may be drivingly connected to the second end portion 270 of the fourth propeller shaft 260 by using a crash collapse assembly according to an embodiment of the disclosure.

Drivingly connected to an end of the sixth coupling assembly 272, opposite the fourth propeller shaft 260 is an end of a rear tandem axle system input shaft 274. As a non-limiting example, the rear tandem axle input shaft 274 is a rear tandem axle differential input shaft, a coupling shaft, stub shaft or a rear tandem axle differential pinion shaft. Drivingly connected to an end of the rear tandem axle input shaft 274, opposite the fourth propeller shaft 260, is the rear tandem axle differential 268. The rear tandem axle differential 268 is a set of gears that allows the outer drive wheel(s) of the wheeled vehicle to rotate at a faster rate that the inner drive wheel(s). The rotational power is transmitted through the rear tandem axle system 266 as described in more detail below.

The rear tandem axle system 266 further includes a first rear tandem axle half shaft 276 and a second rear tandem axle half shaft 278. The first rear tandem axle half shaft 276 extends substantially perpendicular to the rear tandem axle system input shaft 274. A first end portion 280 of the first rear tandem axle half shaft 276 is drivingly connected to a first rear tandem axle wheel assembly 282 and a second end portion 284 of the first rear tandem axle half shaft 276 is drivingly connected to an end of the rear tandem axle differential 268. As a non-limiting example, the second end portion 284 of the first rear tandem axle half shaft 276 is drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle system input shaft 274 is the second forward tandem axle half shaft 278. A first end portion 286 of the second rear tandem axle half shaft 278 is drivingly connected to a second rear tandem axle wheel assembly 288. A second end portion 290 of the second rear tandem axle half shaft 278 is drivingly connected to an end of the rear tandem axle differential 268 opposite the first rear tandem axle half shaft 276. As a non-limiting example, the second end portion 290 of the second rear tandem axle half shaft 278 is drivingly connected to a rear tandem axle differential side gear, a separate stub shaft, a separate coupling shaft, a second rear tandem axle differential output shaft and/or a shaft that is formed as part of a rear tandem axle differential side gear.

Figure 3:
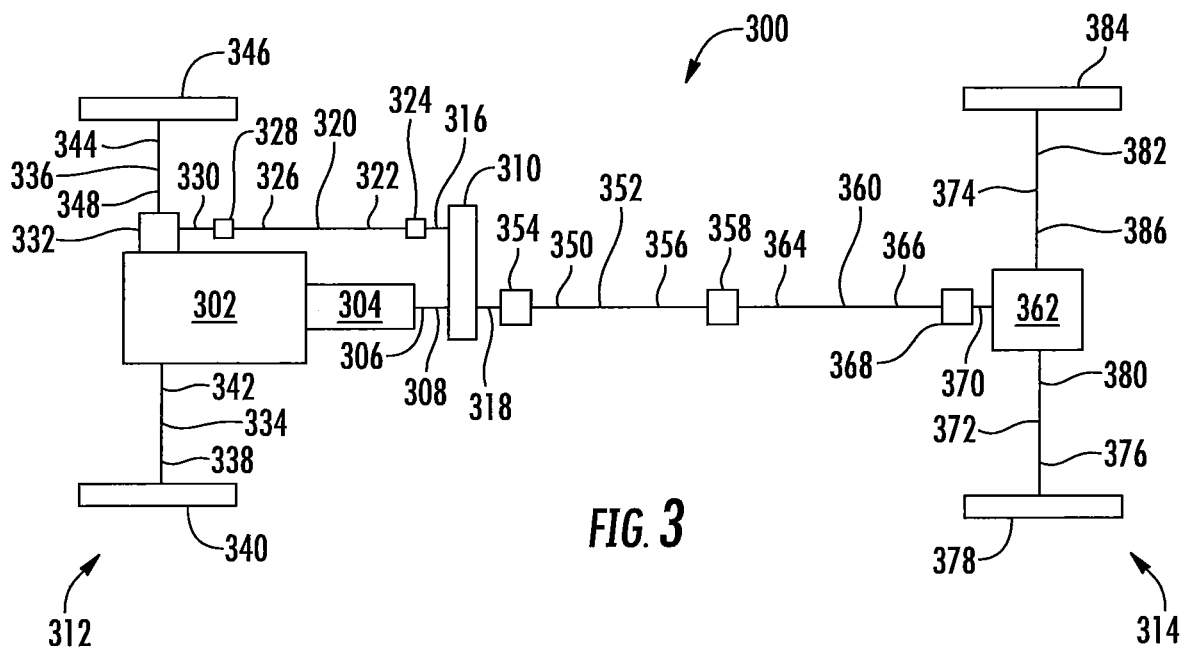
FIG. 3 is a schematic top-plan view of yet another vehicle having one or more shaft assemblies according to an embodiment of the disclosure.

FIG. 3 is a schematic top-plan view of a vehicle 300 having one or more shaft assemblies according to an embodiment of the disclosure. The vehicle 300 has an engine 302 which is drivingly connected to a transmission 304. A transmission output shaft 306 is then drivingly connected to an end of the transmission 304 opposite the engine 302. The transmission 304 is a power management system which provides controlled application of the rotational energy generated by the engine 302 by means of a gearbox.

The transmission output shaft 306 is drivingly connected to a transfer case input shaft 308 which in turn is drivingly connected to a transfer case 310. The transfer case 310 is used to transfer the rotational power from the transmission 304 to a front axle system 312 and a rear axle system 314 by utilizing a series of gears and drive shafts. The transfer case 310 includes a first transfer case output 316 shaft and a second transfer case output shaft 318.

A first propeller shaft 320 extends from the first transfer case output shaft 316 to the front axle system 312 of the vehicle 300. A first end portion 322 of the first propeller shaft 320 is drivingly connected to an end of the first transfer case output shaft 316 opposite the transfer case 310 via a first coupling assembly 324. As a non-limiting example, the first coupling assembly 324 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the first coupling assembly 324 may be drivingly connected to the first end portion 322 of the first propeller shaft 320 by using a crash collapse assembly according to an embodiment of the disclosure.

As illustrated in FIG. 3 of the disclosure, a second end portion 326 of the first propeller shaft 320 is drivingly connected to a second coupling assembly 328. As a non-limiting example, the second coupling assembly 328 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the second coupling assembly 328 may be drivingly connected to the second end portion 326 of the first propeller shaft 320 by using a crash collapse assembly according to an embodiment of the disclosure.

Drivingly connected to an end of the second coupling assembly 328 is an end of a front axle system input shaft 330. As a non-limiting example, the front axle system input shaft 330 is a front axle differential input shaft, a coupling shaft, stub shaft or a front axle differential pinion shaft. Drivingly connected to an end of the front axle system input shaft 330, opposite the first propeller shaft 320, is a front axle differential 332. The front axle differential 332 is a set of gears that allows the outer drive wheel(s) of the wheeled vehicle to rotate at a faster rate that the inner drive wheel(s). The rotational power is transmitted through the front axle system 312 as described in more detail below.

The front axle system 312 further includes a first front axle half shaft 334 and a second front axle half shaft 336. The first front axle half shaft 334 extends substantially perpendicular to the front axle system input shaft 330. A first end portion 338 of the first front axle half shaft 334 is drivingly connected to a first front axle wheel assembly 340 and a second end portion 342 of the first front axle half shaft 334 is drivingly connected to an end of the front axle differential 332. As a non-limiting example, the second end portion 342 of the first front axle half shaft 334 is drivingly connected to a front axle differential side gear, a separate stub shaft, a separate coupling shaft, a first front axle differential output shaft and/or a shaft that is formed as part of a front axle differential side gear.

Extending substantially perpendicular to the front axle system input shaft 330 is the second front axle half shaft 336. A first end portion 344 of the second front axle half shaft 336 is drivingly connected to a second front axle wheel assembly 346. A second end portion 348 of the second front axle half shaft 336 is drivingly connected to an end of the front axle differential 332 opposite the first front axle half shaft 334. As a non-limiting example, the second end portion 348 of the second front axle half shaft 336 is drivingly connected to a front axle differential side gear, a separate stub shaft, a separate coupling shaft, a second front axle differential output shaft and/or a shaft that is formed as part of a front axle differential side gear.

An end of the second transfer case output shaft 318 is drivingly connected to an end of the transfer case 310 opposite the transfer case input shaft 308. As illustrated in FIG. 3 of the disclosure, a first end portion 350 of a second propeller shaft 352 is drivingly connected to an end of the second transfer case output shaft 318 opposite the transfer case 310 via a third coupling assembly 354. As non-limiting example, the third coupling assembly 354 is a universal joint assembly, a U-joint assembly, a universal coupling assembly, a cardan joint assembly, a double cardan joint assembly, a Hooke's joint assembly, a Spicer joint assembly, a homo-kinetic coupling assembly, a constant velocity joint assembly or a Hardy Spicer joint assembly. It is within the scope of this disclosure that the third coupling assembly 354 may be drivingly connected to the first end portion 350 of a second propeller shaft 352 by using a crash collapse assembly according to an embodiment of the disclosure.

As illustrated in FIG. 3 of the disclosure, a second end portion 356 of the second propeller shaft 352 is drivingly connected to a fourth coupling assembly 358. As a non-limiting example, the fourth coupling assembly 358 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the fourth coupling assembly 358 may be drivingly connected to the second end portion 356 of the second propeller shaft 352 by using a crash collapse assembly according to an embodiment of the disclosure.

Drivingly connected to an end of the fourth coupling assembly 358, opposite the second propeller shaft 352, is a third propeller shaft 360. The third propeller shaft 360 drivingly connects the transfer case 310 to a rear differential 362 of the rear axle system 314. As illustrated in FIG. 3 of the disclosure, a first end portion 364 of the third propeller shaft 360 is drivingly connected to an end of the fourth coupling assembly 358 opposite the second propeller shaft 352. It is within the scope of this disclosure that the fourth coupling assembly 358 may be drivingly connected to the first end portion 364 of the third propeller shaft 360 by using a crash collapse assembly according to an embodiment of the disclosure.

A second end portion 366 of the third propeller shaft 360 is drivingly connected to an end of a fifth coupling assembly 368. As a non-limiting example, the fifth coupling assembly 368 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the fifth coupling assembly 368 may be drivingly connected to the second end portion 366 of the third propeller shaft 360 by using a crash collapse assembly according to an embodiment of the disclosure.

Drivingly connected to an end of the fifth coupling assembly 368, opposite the third propeller shaft 360, is an end of a rear axle system input shaft 370. An end of the rear axle system input shaft 370, opposite the third propeller shaft 360, is drivingly connected to the rear differential 362 of the rear axle system 314. As a non-limiting example, the rear axle system input shaft 370 is a rear differential input shaft, a coupling shaft, stub shaft or a rear axle differential pinion shaft. The rear axle differential 362 is a set of gears that allows the outer drive wheel(s) of the wheeled vehicle to rotate at a faster rate that the inner drive wheel(s). The rotational power is transmitted through the rear axle system 314 as described in more detail below.

The rear axle system 314 further includes a first rear axle half shaft 372 and a second rear axle half shaft 374. The first rear axle half shaft 372 extends substantially perpendicular to the rear axle system input shaft 370. A first end portion 376 of the first rear axle half shaft 372 is drivingly connected to a first rear axle wheel assembly 378 and a second end portion 380 of the first rear axle half shaft 372 is drivingly connected to an end of the rear axle differential 362. As a non-limiting example, the second end portion 380 of the first rear axle half shaft 372 is drivingly connected to a rear axle differential, side gear, a separate stub shaft, a separate coupling shaft, a first rear axle differential output shaft and/or a shaft that is formed as part of a rear axle differential side gear.

Extending substantially perpendicular to the rear axle system input shaft 370 is the second rear axle half shaft 374. A first end portion 382 of the second rear axle half shaft 374 is drivingly connected to a second rear axle wheel assembly 384. A second end portion 386 of the second rear axle half shaft 374 is drivingly connected to an end of the rear axle differential 362 opposite the first rear axle half shaft 372. As a non-limiting example, the second end portion 386 of the second rear axle half shaft 374 is drivingly connected to a rear axle differential side gear, a separate stub shaft, a separate coupling shaft, a second rear axle differential output shaft and/or a shaft that is formed as part of a rear axle differential side gear.

Figure 4:
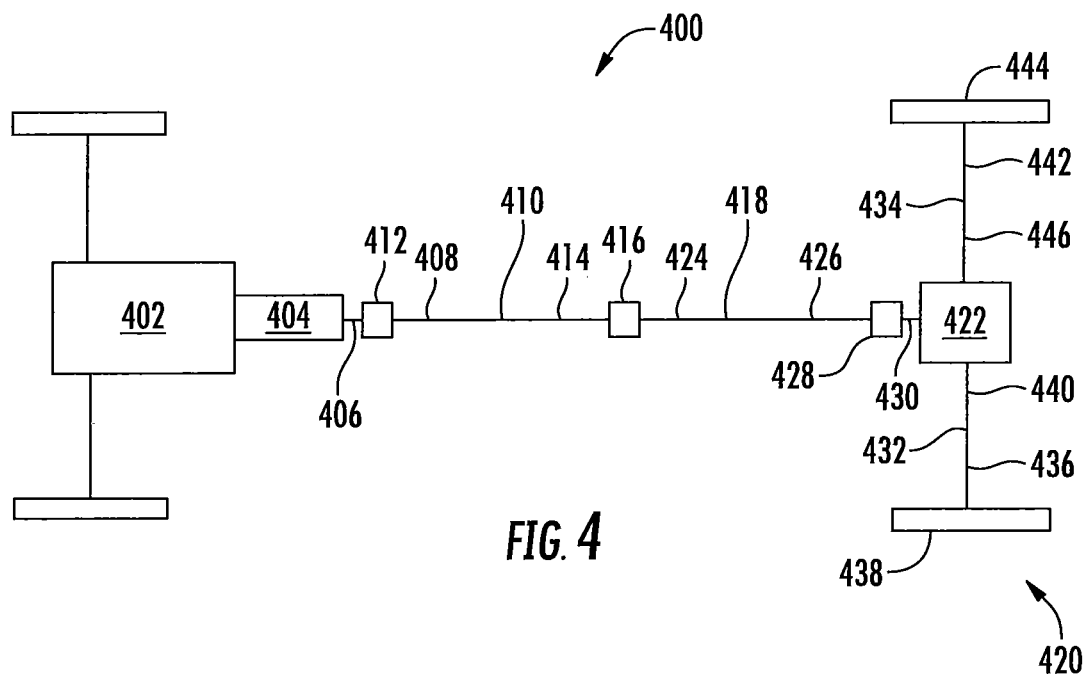
FIG. 4 is a schematic top-plan view of still yet another vehicle having one or more shaft assemblies according to an embodiment of the disclosure.

FIG. 4 is a schematic top-plan view of a vehicle 400 having one or more shaft assemblies according to an embodiment of the disclosure. The vehicle 400 has an engine 402 which is drivingly connected to a transmission 404. A transmission output shaft 406 is drivingly connected to an end of the transmission 404 opposite the engine 402. The transmission 404 is a power management system which provides controlled application of the rotational power generated by the engine by means of a gear box.

A first end portion 408 of a first propeller shaft 410 is drivingly connected to an end of the transmission output shaft 406 opposite the transmission 404 via a first coupling assembly 412. As a non-limiting example, the first coupling assembly 412 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the first coupling assembly 412 may be drivingly connected to the first end portion 408 of the first propeller shaft 410 by using a crash collapse assembly according to an embodiment of the disclosure.

As illustrated in FIG. 4 of the disclosure, a second end portion 414 of the first propeller shaft 410 is drivingly connected to a second coupling assembly 416. As a non-limiting example, the second coupling assembly 416 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the second coupling assembly 416 may be drivingly connected to the second end portion 414 of the first propeller shaft 410 by using a crash collapse assembly according to an embodiment of the disclosure.

Drivingly connected to an end of the second coupling assembly 416, opposite the first propeller shaft 410, is a second propeller shaft 418. The second propeller shaft 418 drivingly connects the transmission 404 to a rear axle system 420 having rear axle differential 424. As illustrated in FIG. 4 of the disclosure, a first end portion 424 of the second propeller shaft 418 is drivingly connected to an end of the second coupling assembly 416 opposite the first propeller shaft 410. It is within the scope of this disclosure that the second coupling assembly 416 may be drivingly connected to the first end portion 424 of the second propeller shaft 418 by using a crash collapse assembly according to an embodiment of the disclosure.

A second end portion 426 of the second propeller shaft 418 is drivingly connected to an end of a third coupling assembly 428. As a non-limiting example, the third coupling assembly 428 is a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. It is within the scope of this disclosure that the third coupling assembly 428 may be drivingly connected to the second end portion 426 of the second propeller shaft 418 by using a crash collapse assembly according to an embodiment of the disclosure.

Drivingly connected to an end of the third coupling assembly 426, opposite the second propeller shaft 418, is an end of a rear axle system input shaft 430. An end of the forward tandem axle system input shaft 430, opposite the second propeller shaft 418, is drivingly connected to the rear axle differential 422 of the rear axle system 420. As a non-limiting example, the rear axle system input shaft 430 is a rear axle differential input shaft, a coupling shaft, stub shaft or a rear axle differential pinion shaft. The rear axle differential 422 is a set of gears that allows the outer drive wheel(s) of the wheeled vehicle to rotate at a faster rate that the inner drive wheel(s). The rotational power is transmitted through the rear axle system 420 as described in more detail below.

The rear axle system 420 further includes a first rear axle half shaft 432 and a second rear axle half shaft 434. The first rear axle half shaft 432 extends substantially perpendicular to the rear axle system input shaft 430. A first end portion 436 of the first rear axle half shaft 432 is drivingly connected to a first rear axle wheel assembly 438 and a second end portion 440 of the first rear axle half shaft 432 is drivingly connected to an end of the rear axle differential 422. As a non-limiting example, the second end portion 440 of the first rear axle half shaft 432 is drivingly connected to a rear axle differential side gear, a separate stub shaft, a separate coupling shaft, a first rear axle differential output shaft and/or a shaft that is formed as part of a rear axle differential side gear.

Extending substantially perpendicular to the rear axle system input shaft 430 is the second rear axle half shaft 434. A first end portion 442 of the second rear axle half shaft 434 is drivingly connected to a second rear axle wheel assembly 444. A second end portion 446 of the second rear axle half shaft 434 is drivingly connected to an end of the rear axle differential 422 opposite the first rear axle half shaft 432. As a non-limiting example, the second end portion 446 of the second rear axle half shaft 434 is drivingly connected to a rear axle differential side gear, a separate stub shaft, a separate coupling shaft, a second rear axle differential output shaft and/or a shaft that is formed as part of a rear axle differential side gear.

Figure 5:
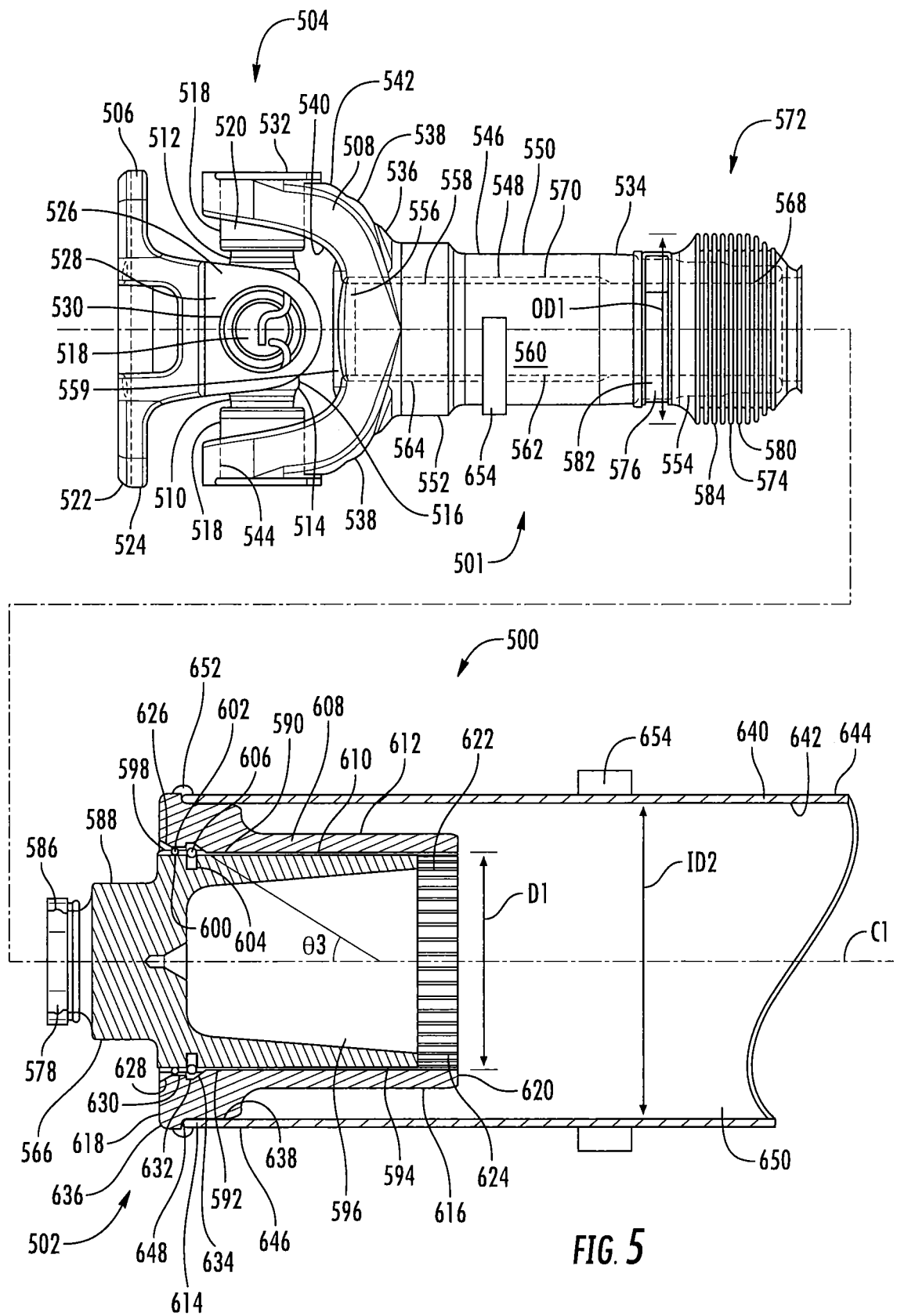
FIG. 5 is a partial cut-away schematic side-view of a shaft assembly according to an embodiment of the disclosure when the shaft assembly is in a first position.
Figure 5A:
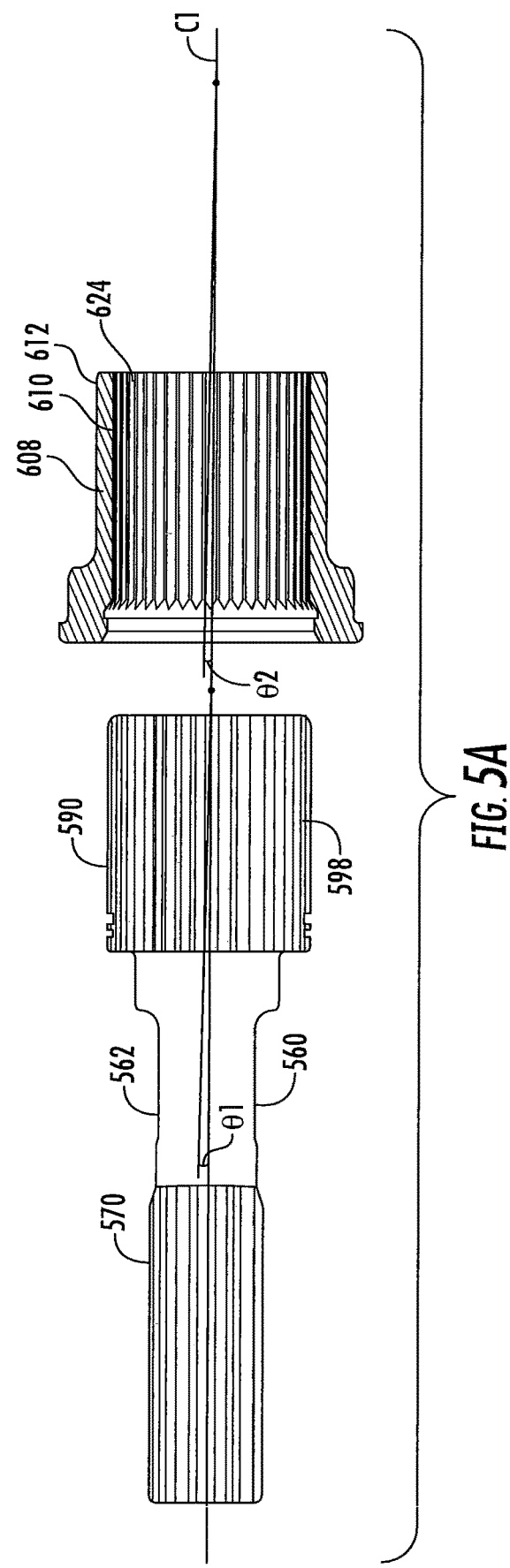
FIG. 5A is a partial cut-away schematic side-view of a portion of a crash collapse assembly according to an embodiment of the disclosure.
Figure 6:
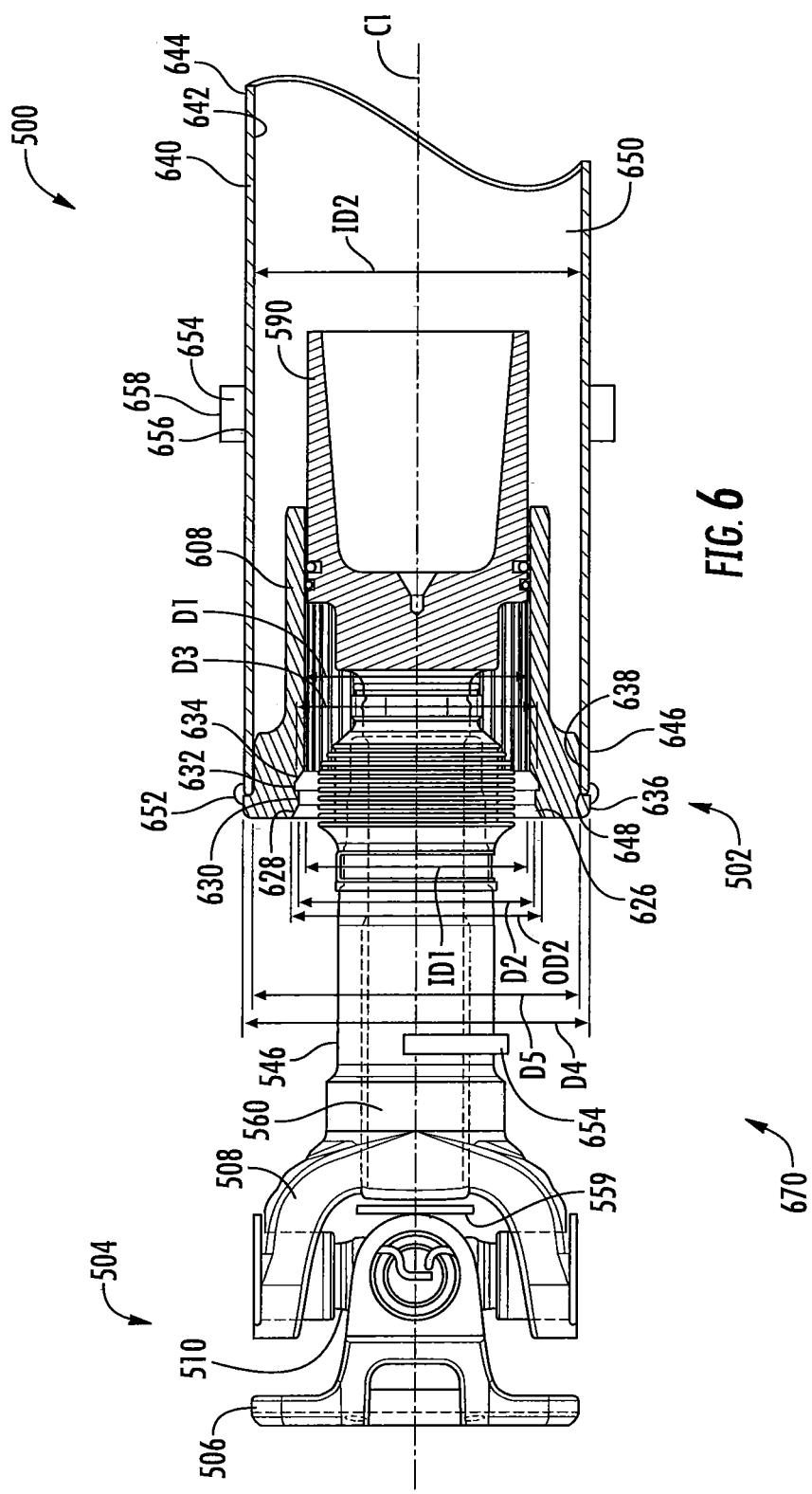
FIG. 6 is a partial cut-away schematic side-view of the shaft assembly illustrated in FIG. 5 in a second.

FIGS. 5, 5A and 6 are a partial cut-away schematic side-view of a shaft assembly 500 having a crash collapse assembly 502 according to an embodiment of the disclosure. When the shaft assembly 500 is in the position illustrated in FIG. 5 of the disclosure, the shaft assembly 500 is in a first position 501. As illustrated in FIGS. 5 and 6 of the disclosure, the shaft assembly 500 includes a joint assembly 504 having a first joint member 506, a second joint member 508 and a third joint member 510 drivingly connecting the first and second joint members 504 and 506 together. In accordance with the embodiment of the disclosure illustrated in FIGS. 5 and 6 and as a non-limiting example, the coupling assembly 500 may be a universal joint assembly, a universal coupling, a U-joint, a Cardan Joint a Hardy-Spicer joint or a Hooke's joint.

The third joint member 510 includes a plurality of trunnions 512 extending from an outer surface 514 of a central body portion 516 of the third joint member 510 of the joint assembly 504. As best seen in FIG. 5 of the disclosure, the plurality of trunnions 512 extending from the outer surface 514 of the central body portion 516 are disposed equidistant from each other along the outer surface 514 of the central body portion 516 of the third joint member 51. According to an embodiment of the disclosure and as a non-limiting example, the third shaft member 510 is a journal cross.

Rotatively connected to at least a portion of the outer surface 514 of each of the plurality of trunnions 512 of the third joint member 510 is a bearing cap assembly 518. It is within the scope of this disclosure and as a non-limiting example that the bearing cap assembly 518 includes a bearing cap 520 which houses a plurality of bearings (not shown) that are disposed along an inner surface (not shown) of the bearing cap 520. The bearing cap assembly 518 provides a rotational connection between the third joint member 510 and the first and second joint members 506 and 508 of the joint assembly 504 thereby reducing the amount of friction between the first, second and third joint members 506, 508 and 510 when in operation.

As best seen in FIG. 5 of the disclosure, the first joint member 506 has a first end portion 522 and a second end portion 524. Extending outward from at least a portion of the second end portion 524 of the first joint member 506 is one or more axially extending arms 526 having an inner surface (not shown) and an outer surface 528. One or more openings 530 extend from an inner surface (not shown) to an outer surface 528 of the one or more axially extending arms 526 of the first joint member 506 of the joint assembly 504. The one or more openings 530 in the one or more axially extending arms 526 are of a size and shape to receive and/or retain at least a portion of the bearing cap assembly 518 connected to the outer surface 514 of the plurality of trunnions 512 of the third joint member 510. As a non-limiting example, the bearing cap assembly 518 may be retained within the one or more openings 530 in the one or more axially extending arms 526 of the first joint member 506 by using one or more welds, one or more adhesives, one or more mechanical fasteners and/or a threaded connection. It is within the scope of this disclosure and as a non-limiting example that the first joint member 506 of the joint assembly 506 may be a flange yoke.

In accordance with the embodiment of the disclosure illustrated in FIG. 5 the second joint member 508 has a first end portion 532, a second end portion 534 and an intermediate portion 536 interposed between the first and second end portion 532 and 534 of the second joint member 508. One or more axially extending arms 538 having an inner surface 540 and an outer surface 542 extend outboard from at least a portion of the intermediate portion 536 of the second joint member 508 toward the first joint member 506. Extending from the inner surface 540 to the outer surface 542 of the one or more axially extending arms 538 of the second joint member 508 is one or more openings 544. The one or more openings 544 in the one or more axially extending arms 538 of the second joint member 508 are of a size and a shape to receive and/or retain at least a portion of the bearing cap assembly 518 connected to the outer surface 514 of the plurality of trunnions 512 of the third joint member 510. As a non-limiting example, the bearing cap assembly 518 may be retained within the one or more openings 544 in the one or more axially extending arms 538 of the second joint member 508 by using one or more welds, one or more adhesives, one or more mechanical fasteners and/or a threaded connection. It is within the scope of this disclosure and as a non-limiting example that the second joint member 508 may be a slip yoke.

Extending outboard from at least a portion of the intermediate portion 536 of the second joint member 508, away from the first joint member 506, is a substantially cylindrical body portion 546 having an inner surface 548, an outer surface 550, a first end portion 552 and a second end portion 554. The inner surface 548 and the outer surface 550 defines a hollow portion 556 therein. Circumferentially extending along at least a portion of the inner surface 548 of the substantially cylindrical body portion 546 of the second joint member 508 is a plurality of axially extending body portion splines 558.

At least a portion of a plug member 559 is disposed within the hollow portion 556 of the substantially cylindrical body portion 546 of the second joint member 508 of the joint assembly 504. The plug member 559 provides a seal for one end of the hollow portion 556 of the substantially cylindrical body portion 546 of the second joint member 508 thereby preventing the migration of dust, debris and/or moisture from the external environment into the hollow portion 556 of the second joint member 508. As best seen in FIG. 5 of the disclosure, the plug member 559 is disposed proximate to the first and third joint members 506 and 510. It is within the scope of this disclosure that the plug member 559 may be removable from the second joint member 508 upon the application a pre-determined amount of force onto the plug member 559. As a non-limiting example, the plug member 559 may be secured within the hollow portion 556 of the substantially cylindrical body portion 546 of the second joint member 508 by using a threaded connection, a press-fit connection, one or more mechanical fasteners and/or one or more welds.

Drivingly connected to at least a portion of the substantially cylindrical body portion 546 of the second joint member 508 is a first shaft 560 having an outer surface 562, a first end portion 564, a second end portion 566 and an intermediate portion 568 interposed between the first end portion 564 and the second end portion 566 of the first shaft 560. As illustrated in FIGS. 5 and 6 of the disclosure, the first shaft 560 of the crash collapse assembly 502 extends co-axially with the substantially cylindrical body portion 546 of the second joint member 508 of the joint assembly 504. Circumferentially extending among at least a portion of the outer surface 566 of the first shaft 560 is a plurality of axially extending first shaft splines 570. The plurality of axially extending first shaft splines 570 are complementary to and meshingly engaged with the plurality of axially extending body portion splines 558 on the inner surface 548 of the substantially cylindrical body portion 546 of the second joint member 508.

A boot assembly 572 is disposed radially outboard from art least a portion of the first shaft 560 and the second joint member 508 of the shaft assembly 500. As best seen in FIG. 5 of the disclosure, the boot assembly 572 includes a flexible boot 574 having a first end portion 576, a second end portion 578 and an intermediate portion 580 interposed between the first end portion 576 and the second end portion 578 of the flexible boot 574. The flexible boot 558 provides a flexible seal for the shaft assembly 500 preventing the migration of dust, debris and/or moisture from the external environment into the splining engagement between the substantially cylindrical body portion 546 of the second joint member 508 and the first shaft 560 of the shaft assembly 500. As a non-limiting example, the flexible boot 574 is made of a polymeric material, a rubber material, an elastomeric material, a thermoplastic material or a combination thereof.

At least a portion of the first end portion 576 of the flexible boot 574 is connected to at least a portion of the substantially cylindrical body portion 546 of the second joint member 508 of the joint assembly 504. In accordance with an embodiment of the disclosure and as a non-limiting example, the first end portion 576 of the flexible boot 574 is connected to least a portion of the substantially cylindrical body portion 546 of the second joint member 508 by using a first boot retention member 582. As a non-limiting example, the first boot retention member 582 is a boot clamp.

In accordance with the embodiment of the disclosure illustrated in FIG. 5 and as a non-limiting example, the intermediate portion 580 of the flexible boot 574 has a plurality of convolutions 584. The plurality of convolutions 584 of the flexible boot 574 allows the first shaft 560 to translate axially a pre-determined amount of distance relative to the substantially cylindrical body portion 546 of the second joint member 508 while still providing a sealing engagement between the substantially cylindrical body portion 546 and the first shaft 560 of the shaft assembly 500.

At least a portion of the second end portion 578 of the flexible boot 574 is connected to at least a portion of the intermediate portion 568 of the first shaft 560. In accordance with an embodiment of the disclosure and as a non-limiting example, the second end portion 578 of the flexible boot 574 is connected to at least a portion of the intermediate portion 568 of the first shaft 560 by using a second boot retention member 586. As a non-limiting example, the second boot retention member 586 is a boot clamp.

Circumferentially extending from at least a portion of the outer surface 562 of the second end portion 566 of the first shaft 560 is a first increased diameter portion 588. In accordance with the embodiment of the disclosure and as a non-limiting example, the first increased diameter portion 588 of the first shaft 560 is substantially cylindrical in shape.

Disposed adjacent to and axially outboard from the first increased diameter portion 588 of the first shaft 560 is a second increased diameter portion 590 having a first end portion 592, a second end portion 594 and a hollow portion 596 therein. Circumferentially extending along at least a portion of the outer surface 562 of the second increased diameter portion 590 of the first shaft 560 is a plurality of axially extending increased diameter portion splines 598. As a non-limiting example, the second increased diameter portion 590 of the second shaft 560 is substantially cylindrical in shape.

In accordance with the embodiment of the disclosure illustrated in FIG. 5A and as a non-limiting example, the plurality of axially extending increased diameter portion splines 598 on the outer surface 562 of the second increased diameter portion 590 of the first shaft 560 may be oriented at a helix angle θ1 relative to a centerline C1 of the shaft assembly 500. As a non-limiting example, the helix angle θ1 of the plurality of axially extending increased diameter portion splines 598 is from approximately 0.2° to approximately 0.3°.

An O-ring groove 600 circumferentially extends along at least a portion of the first end portion 596 of the second increased diameter portion 590 of the first shaft 560 of the crash collapse assembly 502. In accordance with the embodiment of the disclosure illustrated in FIG. 5, the O-ring groove 600 is disposed within the plurality of axially extending increased diameter portion splines 598 on the second increased diameter portion 590 of the first shaft 560. The O-ring groove 600 in the outer surface 562 of the second increased diameter portion 590 of the first shaft 560 is of a size and shape to receive and/or retain at least a portion of an O-ring 602.

Circumferentially extending along at least a portion of the outer surface 562 of the second increased diameter portion 590 of the first shaft 560 is a retaining member groove 604. As best seen in FIG. 5 of the disclosure, the retaining member groove 604 is disposed axially outboard from and adjacent to the O-ring groove 600 in the outer surface 562 of the second increased diameter portion 590 of the first shaft 560. The retaining member groove 604 is of a size and shape to receive and/or retain at least a portion of a retaining member 606. As a non-limiting example, the retaining member 606 is a snap-ring, a circlip, a C-Clip, a Seeger ring, or any other type of semi-flexible retaining member that is able to axially restrain one component relative to another.

Drivingly connected to at least a portion of the first shaft 560 is a crash collapse adapter 608 having an inner surface 610, an outer surface 612, a first end portion 614, a second end portion 616, a first end 618 and a second end 620. As best seen in FIG. 5 of the disclosure, the crash collapse adapter 608 extends co-axially with and is disposed at least partially radially outboard from the second increased diameter portion 590 of the first shaft 560. The inner surface 610 and the outer surface 612 of the crash collapse adapter 608 defines a hollow portion 622 therein. In accordance with an embodiment of the disclosure and as a non-limiting example, the hollow portion 622 of the crash collapse adapter 608 has a diameter D1 that is greater than an outermost diameter OD1 of the flexible boot 574 of the boot assembly 572.

As best seen in FIG. 5 of the disclosure, a plurality of axially extending crash collapse adapter splines 624 circumferentially extend along at least a portion of the inner surface 610 of the crash collapse adapter 608 of the crash collapse assembly 502. The plurality of axially extending crash collapse adapter splines 624 are complementary to and meshingly engaged with the plurality of axially extending increased diameter portion splines 598 on the outer surface 562 of the second increased diameter portion 590 of the first shaft 560.

In accordance with the embodiment of the disclosure illustrated in FIG. 5A and as a non-limiting example, the plurality of axially extending crash collapse adapter splines 624 on the inner surface 610 of the crash collapse adapter 608 may be orientated at a helix angle θ2 relative to the centerline C1 of the shaft assembly 500. The helix angle θ2 of the plurality of axially extending crash collapse adapter splines 624 is complementary to the helix angle θ1 of the plurality of axially extending increased diameter portion splines 598 on the outer surface 562 of the second increased diameter portion 590 of the first shaft 560. By orienting the plurality of axially extending crash collapse adapter splines 624 at the helix angle θ2 and the plurality of axially extending increased diameter portion splines 598 at the helix angle θ1 the amount of noise vibration and harshness (NVH) experienced by a vehicle (not shown) when in operation can be reduced. As a non-limiting example, the helix angle θ2 of the plurality of axially extending crash collapse adapter splines 624 is from approximately 0.2° to approximately 0.3°.

Extending from the first end 618 of the crash collapse adapter 608 and along at least a portion of the inner surface 610 of the crash collapse adapter 608 is a crash collapse feature 626. As illustrated in FIGS. 5 and 6 of the disclosure and as a non-limiting example, the crash collapse feature 626 of the crash collapse adapter 608 includes, in axial order, a first decreasing diameter portion 628, a substantially cylindrical portion 630, an increased diameter portion 632 and a second reduced diameter portion 634. In accordance with the embodiment of the disclosure illustrated in FIGS. 5 and 6, the first decreasing diameter portion 628 extends from the first end 618 of the crash collapse adapter 608 to an end of the substantially cylindrical portion 630 of the crash collapse feature 626 of the crash collapse adapter 608. According to an embodiment of the disclosure and as a non-limiting example, the decreasing diameter portion 628 has an outermost diameter OD2, at the first end 618 of the crash collapse adapter 608 that is greater than a diameter D2 of the substantially cylindrical portion 630 of the crash collapse feature 626. In accordance with an embodiment and as a non-limiting example, the diameter D2 of the substantially cylindrical portion 630 and the outermost diameter OD2 of the decreasing diameter portion 628 of the crash collapse feature 626 are greater than the diameter D1 of the hollow portion 622 of the crash collapse adapter 608. As a non-limiting example, the first decreasing diameter portion 628 of the crash collapse feature 626 is a lead-in chamfer.

An end of the substantially cylindrical portion 630 of the crash collapse feature 626, opposite the decreasing diameter portion 628, is connected to the increased diameter portion 632 of the crash collapse feature 626. As best seen in FIG. 6 of the disclosure, the increased diameter portion 632 of the crash collapse feature 626 has a diameter D3 that is greater than the diameter D2 of the substantially cylindrical portion 630 of the crash collapse feature 626. Additionally, as best seen in FIG. 6 of the disclosure, the diameter D3 of the crash collapse feature 626 is greater than the diameter D1 of the hollow portion 622 of the crash collapse adapter 608. In accordance with an embodiment of the disclosure and as a non-limiting example, the increased diameter portion 632 of the crash collapse feature 626 in the inner surface 610 of the crash collapse adapter 608 is substantially cylindrical in shape.

As illustrated in FIGS. 5 and 6 of the disclosure, the second decreasing diameter portion 634 of the crash collapse feature 626 of the crash collapse adapter 608 is connected to an end of the increased diameter portion 632 opposite the substantially cylindrical portion 630 of the crash collapse feature 626. In accordance with the embodiment of the disclosure illustrated in FIG. 5 and as a non-limiting example, the second decreasing diameter portion 634 of the crash collapse feature 626 in the inner surface 610 of the crash collapse adapter 608 has an inner most diameter ID1 that is substantially equal to the diameter D1 of the hollow portion 622 of the crash collapse adapter 608.

When the crash collapse assembly 502 is assembled, the second increased diameter portion 590 of the first shaft 560 is inserted within the hollow portion 622 of the crash collapse adapter 608 until the first decreasing diameter portion 628 of the crash collapse feature 626 comes into direct contact with the retaining member 606 disposed within the retaining member groove 604 in the second increased diameter portion 590 of the first shaft 560.

As the retaining member 606 moves across the first decreased diameter portion 628 of the crash collapse feature 626 it is radially compressed for insertion within the increased diameter portion 632 of the crash collapse feature 626. The first decreasing diameter portion 628 of the crash collapse feature 626 reduces the amount of force needed to radially collapse the retaining member 606 making the assembly the assembly of the first shaft 560 within the crash collapse adapter 608 quicker and easier. As a result, the first decreasing diameter portion 628 of the crash collapse feature 626 reduces the overall costs associated with the assembly of the shaft assembly 500 disclosed herein.

Additionally, when the crash collapse assembly 502 of the shaft assembly 500 is assembled, at least a portion of the O-ring 602 is in direct contact with at least a portion of the substantially cylindrical portion 630 of the crash collapse feature 626 in the inner surface 610 of the crash collapse adapter 608. As a result, the O-ring 602 sealingly engages at least a portion of the outer surface 562 of the second increased diameter portion 590 of the first shaft 560 and at least a portion of the inner surface 610 of the crash collapse adapter 608 of the crash collapse assembly 502. This prevents the migration of dust, debris and/or moisture from the external environment into the splining engagement of the crash collapse adapter 608 and the second increased diameter portion 590 of the first shaft 560.

Furthermore, when the crash collapse assembly 502 is assembled, at least a portion of the retaining member 606 is disposed within the increased diameter portion 632 of the crash collapse feature 626 in the inner surface 610 of the crash collapse adapter 608. As a result, the retaining member 606 axially restrains the first shaft 560 of the crash collapse assembly 502 relative to the crash collapse feature 608.

Circumferentially extending radially outboard from at least a portion of the outer surface 612 of the first end portion 614 of the crash collapse adapter 608 is a first increased diameter portion 636 and a second increased diameter portion 638. As illustrated in FIGS. 5 and 6 of the disclosure and as a non-limiting example, the first increased diameter portion 636 of the crash collapse adapter 608 is disposed adjacent to the first end 618 of the crash collapse adapter 608. Additionally, as illustrated in FIGS. 5 and 6 of the disclosure and as a non-limiting example, the second increased diameter portion 638 of the crash collapse adapter

608 is disposed adjacent to an end of the first increased diameter portion 636 opposite the first end 618 of the crash collapse adapter 608. In accordance with the embodiment of the disclosure illustrated in FIG. 6 and as a non-limiting example, the first increased diameter portion 636 of the crash collapse adapter 608 has a diameter D4 that is greater than a diameter D5 of the D5 of the second increased diameter portion 638 of the crash collapse adapter 608.

Extending co-axially with and disposed at least partially radially outboard from the crash collapse adapter 608 of the crash collapse assembly 502 is a second shaft 640 having an inner surface 642, an outer surface 644, a first end portion 646, a second end portion (not shown), a first end 648 and a second end (not shown). The inner surface 642 and the outer surface 644 of the second shaft 640 defines a hollow portion 650 therein. In accordance with an embodiment of the disclosure and as a non-limiting example, the second shaft 640 is a propeller shaft, a prop shaft, a drive shaft, a driving shaft or any other type of shaft used to transfer rotational power from one component to another over a relatively large distance.

As illustrated in FIGS. 5 and 6 of the disclosure, at least a portion of the crash collapse adapter 608 is disposed within the hollow portion 650 of the second shaft 640. When assembled, at least a portion of the first increased diameter portion 636 of the crash collapse adapter 606 is in direct contact with at least a portion of the first end 648 of the second shaft 640. This prevents the crash collapse adapter 608 from being inserted within the hollow portion 650 of the second shaft 640 beyond a pre-determined distance. As a result, the first increased diameter portion 636 of the crash collapse adapter 608 aids in decreasing the amount of time needed to assemble the shaft assembly 500 thereby reducing the overall costs associated with the assembly of the shaft assembly 500 disclosed herein.

In accordance with an embodiment of the disclosure and as a non-limiting example, at least a portion of the first end portion 646 of the second shaft 640 may be integrally connected to at least a portion of the outer surface 612 of the crash collapse adapter 608 by using one or more welds, one or more mechanical fasteners, one or more adhesives, a press-fit connection, a spline connection and/or a threaded connection. According to the embodiment of the disclosure illustrated in FIG. 6 and as a non-limiting example, the second shaft 640 has an inner diameter ID2 that is substantially equal to or slightly less than the diameter D5 of the second increased diameter portion 638 extending from the outer surface 612 of the crash collapse adapter 608 providing a press-fit. It is within the scope of this disclosure that one or more welds 652 may be used in combination with the press-fit to connect at least a portion of the first end portion 646 of the second shaft 640 to the first and/or second increased diameter portions 636 and/or 638 extending from the outer surface 612 of the crash collapse feature 608.

It is within the scope of this disclosure that the shaft assembly 500 may further included the use of one or more vibration reduction devices 654 having an inner surface 656 and an outer surface 658. The one or more vibration reduction devices 654 aid in reducing the overall amount of NVH experienced by the vehicle (not shown) when in operation. In accordance with an embodiment of the disclosure and as a non-limiting example, the inner surface 656 of the one or more vibration reductions devices 654 may be integrally connected to at least a portion of the outer surface 644 of the second shaft 640 and/or to at least a portion of the outer surface 550 of the substantially cylindrical body portion 546 of the second joint member 508. As a non-limiting example, the one or more vibration reduction devices 654 are a shaft balancing weight, a damper or any other device that is used to balance, align and/or reduce the amount of NVH in a rotating shaft.

When in operation, the first shaft 560 of the shaft assembly 500 will be allowed to slide freely within the hollow portion 556 of the substantially cylindrical body portion 546 of the second joint member 508 while still providing a driving engagement between the second shaft 640 and the second joint member 508. This will allow shaft assembly 500 to absorb a pre-determined amount of the forces exerted onto the shaft assembly 500 when the vehicle (not shown) is in operation.

As illustrated in FIG. 6, when the vehicle (not shown) is in a second position 670 the vehicle (not shown) has experienced a crash condition. When the vehicle (not shown) experiences the crash condition 670 illustrated in FIG. 5, the first shaft 560 is translated axially within the substantially cylindrical body portion 547 of the second joint member 508 toward the plug member 559. If the amount of force experienced by the shaft assembly 500 during the crash condition 670 is substantially equal to or greater than the amount of force needed to dislodge the plug member 559 from within the hollow portion 556 of the second joint member 508, the first shaft 560 will separate the plug member 559 from the second joint member 508 upon direct contact. This will allow the first shaft 560 to translate axially toward the third joint member 510 until the first shaft 560 comes into direct contact with the third joint member 510 of the joint assembly 504.

Once a pre-determined amount of force is applied onto the retaining member 606 by the first shaft 560 and/or the crash collapse adapter 608, the second decreasing diameter portion 634 of the crash collapse feature 626 will radially collapse the retaining member 606 into the retaining member groove 604 in the outer surface 562 of the second increased diameter portion 590 of the first shaft 560. If the amount of force needed to separate the plug member 559 from the second joint member 508 is substantially equal to or greater than the amount of force needed to radially collapse the retaining member 606 into the retaining member groove 604, then the first shaft 560 will not translate axially beyond the plug member 559 before radially collapsing the retaining member 606. In the event that the amount of force needed to separate the plug member 559 from the second joint member 508 is less than the amount of force needed to radially collapse the retaining member 606 into the retaining member groove 604, then the first shaft 560 will dislodge the plug member 559 from the second joint member 508 and translate axially toward the third joint member 510. In this case, the first shaft 560 will translate axially until it contacts the third joint member 510 before the radially collapsing the retaining member 606 into the retaining member groove 604 in the second increased diameter portion 590 of the first shaft 560.

It is within the scope of this disclosure that the amount of force needed to radially collapse the retaining member 606 into the retaining member groove 604 in the second increased diameter portion 590 of the first shaft 560 is greater than the amount of force exerted on the shaft assembly 500 when the vehicle (not shown) is in normal operation. This will allow the shaft assembly 500 to operate normally until the vehicle (not shown) experiences the crash condition 670 illustrated in FIG. 6 of the disclosure. According to an embodiment of the disclosure and as a non-limiting example, the amount force needed to radially collapse the retaining member 606 into the retaining member groove 604 is from approximately 13 kN to approximately 70 kN. In accordance with an alternative embodiment of the disclosure, the amount force needed to radially collapse the retaining member 606 into the retaining member groove 604 is from approximately 30 kN to approximately 60 kN.

The amount of force needed to radially collapse the retaining member 606 into the retaining member groove 604 in the second increased diameter portion 590 of the first shaft 560 can be customized by altering an angle θ3 of the second decreasing diameter portion 634 of the crash collapse feature 626, the tolerance or the clearance of the spline connection between the first shaft 560 and the crash collapse adapter 608, the helix angles θ1 and θ2 of the plurality of splines 598 and 624 and the material of the retaining member 606. By taking these factors into consideration, the amount of force needed to collapse the retaining member 606 into the retaining member groove 604 can be customized to meet the needs of any situation. This will allow the shaft assembly 500 disclosed herein to be used in a wide variety of applications.

As previously discussed, the angle θ3 of the second decreasing diameter portion 634 of the crash collapse feature 626 can affect the amount of force needed to radially collapse the retaining member 606 into the retaining member groove 604 in the second increased diameter portion 590 of the first shaft 560. As best seen in FIG. 5 of the disclosure, the angle θ3 of the second decreasing diameter portion 634 of the crash collapse feature 626 in the crash collapse adapter 608 is measured from the centerline C1 of the shaft assembly 500. As the angle θ3 of the second decreasing diameter portion 634 of the crash collapse feature 626 increases, the amount of force needed to radially collapse the retaining member 606 into the retaining member groove 604 decreases. In contrast, as the angle θ3 of the second decreasing diameter portion 634 of the crash collapse feature 626 decreases, the amount of force needed to radially collapse the retaining member 606 into the retaining member groove 604 increases. As a non-limiting example, the angle θ3 of the second decreasing diameter portion 634 of the crash collapse feature 626 is from approximately 30° to approximately 45°.

Additionally, as previously discussed, the tolerance or the clearance of the spline connection between the first shaft 560 and the crash collapse adapter 608 can affect the amount of force needed to radially collapse the retaining member 606 into the retaining member groove 604 in the second increased diameter portion 590 of the first shaft 560. As the tolerance or clearance between the plurality of axially extending increased diameter portion splines 598 on the first shaft 560 and the plurality of axially extending crash collapse adapter splines 624 on the crash collapse adapter 608 increases, the amount of force needed to radially collapse the retaining member 606 into the retaining member groove 604 will increase. In contrast, as the tolerance or clearance between the plurality of axially extending increased diameter portion splines 598 and the plurality of axially extending crash collapse adapter splines 624 decreases, the amount of force needed to radially collapse the retaining member 606 into the retaining member groove 604 will decrease.

As discussed previously, the amount of force needed to collapse the retaining member 606 into the retaining member groove 604 can be altered by changing the helix angle θ1 of the plurality of axially extending increased diameter portion splines 598 on the first shaft 560 and by altering helix angle θ2 of the plurality of axially extending crash collapse adapter splines 624 on the crash collapse adapter 608. As the helix angles θ1 and θ2 of the plurality of splines 598 and 624 increases, the amount of force needed to radially collapse the retaining member 606 into the retaining member groove 604 will increase. In contrast, as the helix angles θ1 and θ2 of the plurality of splines 598 and 624 decreases, the amount of force needed to radially collapse the retaining member 606 into the retaining member groove 604 will decrease.

Furthermore, as previously discussed, the amount of force needed to collapse the retaining member 606 into the retaining member groove 604 can be altered by changing the material composition of the retaining member 606 of the crash collapse assembly 502 of the shaft assembly 500. As the material composition of the retaining member 606 changes, the amount of force needed to elastically deform, plastically deform and/or compress the retaining member 606 will change as well.

Once the retaining member 606 has been radially collapsed within the retaining member groove 604 in the second increased diameter portion 590 of the first shaft 560, the first shaft 560, the second joint member 508 and/or the boot assembly 572 will be allowed to translate axially toward the second shaft 640 and into the hollow portion 650 of the second shaft 640. By allowing the first shaft 560, the second joint member 508 and/or the boot assembly 572 to translate axially into the hollow portion 650 of the second shaft 640 the shaft assembly 500 is allowed to absorb an amount of the forces exerted into the shaft assembly 500 when the vehicle (not shown) experiences the crash condition 670. This will prevent the shaft assembly 500 from buckling and injuring vehicle passengers (not shown) when the vehicle (not shown) experiences a crash condition. Additionally, this will prevent the shaft assembly 500 from translating an amount of the forces experienced by the shaft assembly 500 during the crash condition 670 to nearby components (not shown) in the vehicle driveline and damaging those nearby driveline components (not shown). As a result, the crash collapse assembly 502 of the shaft assembly 500 will aid in increasing the overall crash safety rating of the vehicle (not shown).

Figure 7:
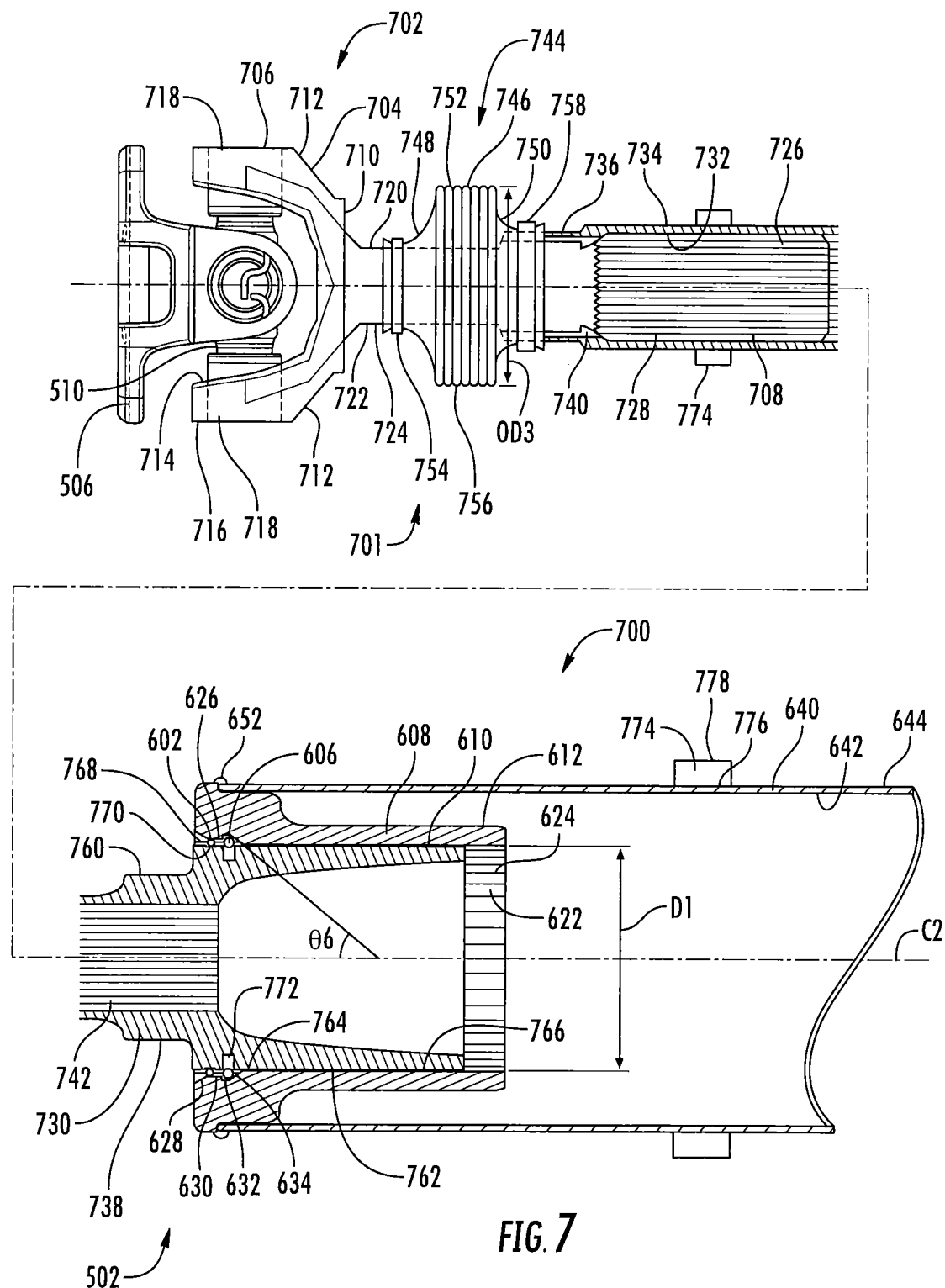
FIG. 7 is a partial cut-away schematic side-view of a shaft assembly according to an alternative embodiment of the disclosure when the shaft assembly is in a first position.
Figure 8:
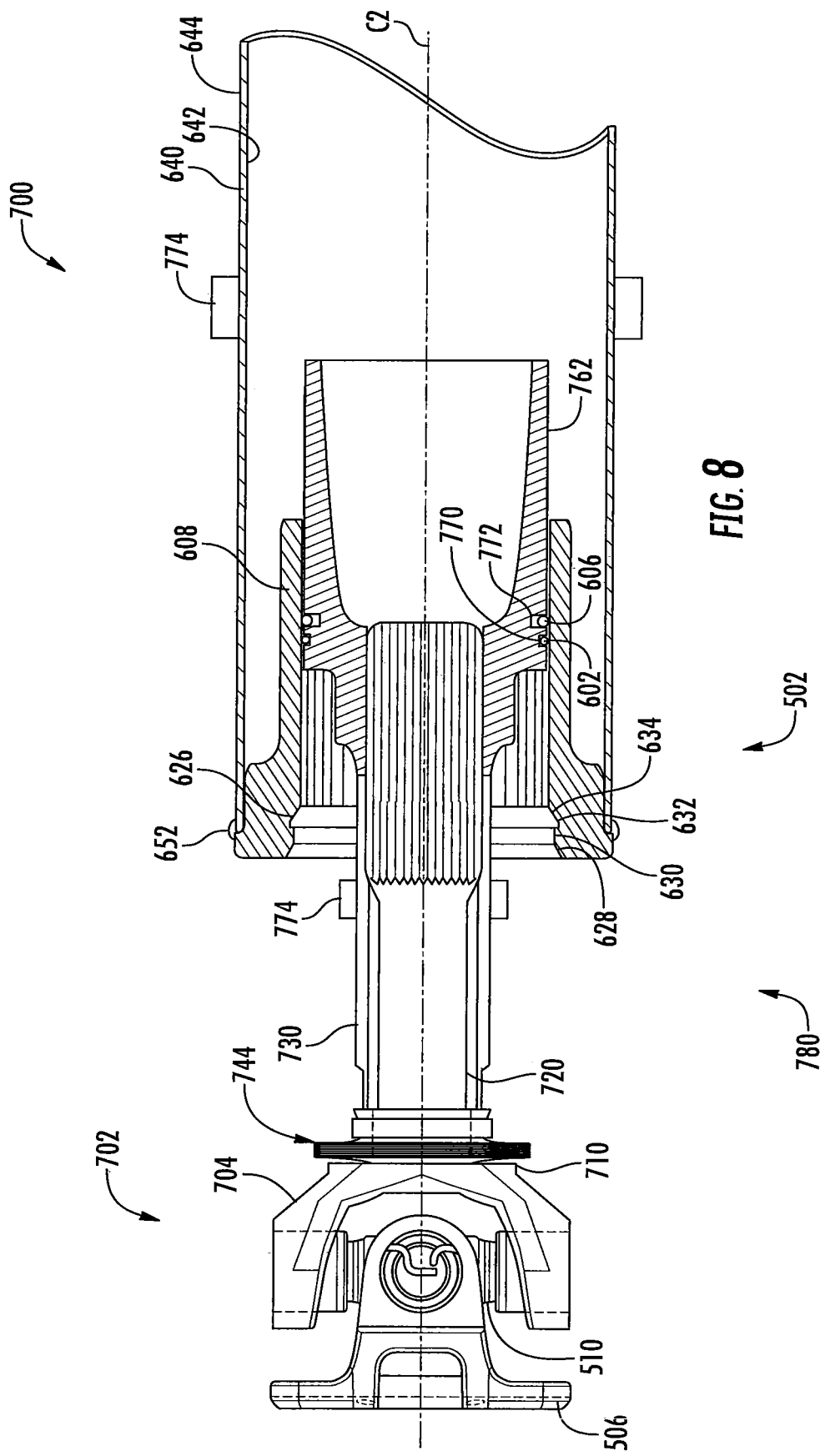
FIG. 8 is a partial cut-away schematic side-view of the shaft assembly illustrated in FIG. 7 in a second position.

FIGS. 7, 7A and 8 are a partial cut-away schematic side-view of a shaft assembly 700 having the crash collapse assembly 502 illustrated in FIGS. 5-6 of the disclosure. When the shaft assembly 700 is in the position illustrated in FIG. 7 of the disclosure, the shaft assembly 700 is in a first position 701. The shaft assembly 700 illustrated in FIGS. 7-8 is the same as the shaft assembly 500 illustrated in FIGS. 5-6, except where specifically noted below. In accordance with the embodiment of the disclosure illustrated in FIGS. 7-8, the shaft assembly 700 does not include the second joint member 508, the first shaft 560, the plug member 559, the boot assembly 572 or the one or more vibration reduction devices 654 illustrated in FIGS. 5-6 of the disclosure.

As best seen in FIG. 7 of the disclosure, the shaft assembly 700 includes a joint assembly 702 having a first joint member 506, a second joint member 704 and a third joint member 510 drivingly connecting the first and second joint members 504 and 704 together. In accordance with this embodiment of the disclosure, the second joint member 702 has a first end portion 706, a second end portion 708 and an intermediate portion 710 interposed between the first end portion 706 and the second end portion 708 of the second joint member 704. One or more axially extending arms 712 having an inner surface 714 and an outer surface 716 extend outboard from at least a portion of the intermediate portion 710 of the second joint member 704 toward the first joint member 506. Extending from the inner surface 714 to the outer surface 716 of the one or more axially extending arms 712 of the second joint member 704 is one or more openings 718. The one or more openings 718 in the one or more axially extending arms 712 of the second joint member 704 are of a size and a shape to receive and/or retain at least a portion of the bearing cap assembly 518 connected to the outer surface 514 of the plurality of trunnions 512 of the third joint member 510. As a non-limiting example, the bearing cap assembly 518 may be retained within the one or more openings 718 in the one or more axially extending arms 712 of the second joint member 704 by using one or more welds, one or more adhesives, one or more mechanical fasteners and/or a threaded connection. It is within the scope of this disclosure and as a non-limiting example that the second joint member 704 may be a slip yoke.

Extending outboard from at least a portion of the intermediate portion 710 of the second joint member 704, away from the first joint member 506, is a substantially cylindrical body portion 720 having an outer surface 722, a first end portion 724 and a second end portion 726. Circumferentially extending along at least a portion of the outer surface 722 of the substantially cylindrical body portion 720 of the second joint member 704 is a plurality of axially extending body portion splines 728.

Drivingly connected to at least a portion of the substantially cylindrical body portion 720 of the second joint member 704 is a first shaft 730 having an inner surface 732, an outer surface 734, a first end portion 736 and a second end portion 738. The inner surface 732 and the outer surface 734 of the first shaft 730 defines a hollow portion 740 therein. As illustrated in FIG. 7 of the disclosure, the hollow portion 740 of the first shaft 730 is of a size and shape to receive and/or retain at least a portion of the substantially cylindrical body portion 720 of the second joint member 704. Additionally, as illustrated in FIGS. 7 and 8 of the disclosure, the first shaft 730 of the crash collapse assembly 502 extends co-axially with the substantially cylindrical body portion 720 of the second joint member 702 of the joint assembly 702.

Circumferentially extending along at least a portion of the inner surface 732 of the first shaft 730 is a plurality of axially extending first shaft splines 742. The plurality of axially extending first shaft splines 742 on the inner surface 732 of the first shaft 730 are complementary to and meshingly engaged with the plurality of axially extending body portion splines 728 on the outer surface 722 of the substantially cylindrical body portion 720 of the second joint member 704.

A boot assembly 744 is disposed radially outboard from art least a portion of the first shaft 730 and the second joint member 704 of the shaft assembly 700. As best seen in FIG. 7 of the disclosure, the boot assembly 744 includes a flexible boot 746 having a first end portion 748, a second end portion 750 and an intermediate portion 752 interposed between the first end portion 748 and the second end portion 750 of the flexible boot 746. The flexible boot 746 provides a flexible seal for the shaft assembly 700 preventing the migration of dust, debris and/or moisture from the external environment into the splining engagement between the substantially cylindrical body portion 720 of the second joint member 704 and the first shaft 730 of the shaft assembly 700. As a non-limiting example, the flexible boot 746 is made of a polymeric material, a rubber material, an elastomeric material, a thermoplastic material or a combination thereof.

According to the embodiment of the disclosure illustrated in FIG. 7 and as a non-limiting example, the flexible boot 746 of the boot assembly 744 has an outermost diameter OD3 that is less than the diameter D1 of the hollow portion 622 of the crash collapse adapter 608.

At least a portion of the first end portion 748 of the flexible boot 746 is connected to at least a portion of the substantially cylindrical body portion 720 of the second joint member 704 of the joint assembly 702. In accordance with an embodiment of the disclosure and as a non-limiting example, the first end portion 748 of the flexible boot 746 is connected to least a portion of the substantially cylindrical body portion 720 of the second joint member 704 by using a first boot retention member 754. As a non-limiting example, the first boot retention member 754 is a boot clamp.

In accordance with the embodiment of the disclosure illustrated in FIG. 7 and as a non-limiting example, the intermediate portion 752 of the flexible boot 746 has a plurality of convolutions 756. The plurality of convolutions 756 of the flexible boot 746 allows the first shaft 730 to translate axially a pre-determined amount of distance relative to the substantially cylindrical body portion 720 of the second joint member 704 while still providing a sealing engagement between the substantially cylindrical body portion 720 and the first shaft 730 of the shaft assembly 700.

At least a portion of the second end portion 750 of the flexible boot 746 is connected to at least a portion of the first end portion 736 of the first shaft 730. In accordance with an embodiment of the disclosure and as a non-limiting example, the second end portion 750 of the flexible boot 746 is connected to at least a portion of the first end portion 736 of the first shaft 730 by using a second boot retention member 758. As a non-limiting example, the second boot retention member 758 is a boot clamp.

Circumferentially extending from at least a portion of the outer surface 734 of the second end portion 738 of the first shaft 730 is a first increased diameter portion 760. In accordance with an embodiment of the disclosure and as a non-limiting example, the first increased diameter portion 760 of the first shaft 730 is substantially cylindrical in shape.

Disposed adjacent to and axially outboard from the first increased diameter portion 760 of the first shaft 730 is a second increased diameter portion 762 having a first end portion 764 and a second end portion 766. Circumferentially extending along at least a portion of the outer surface 734 of the second increased diameter portion 762 of the first shaft 730 is a plurality of axially extending increased diameter portion splines 768. The plurality of axially extending increased diameter portion splines 768 are complementary to and meshingly engaged with the plurality of axially extending crash collapse adapter splines 624 on the inner surface 610 of the crash collapse adapter 608 of the crash collapse assembly 502. As a non-limiting example, the second increased diameter portion 762 of the second shaft 730 is substantially cylindrical in shape.

In accordance with the embodiment of the disclosure illustrated in FIG. 7A and as a non-limiting example, the plurality of axially extending increased diameter portion splines 768 on the outer surface 734 of the second increased diameter portion 762 of the first shaft 730 may be oriented at a helix angle θ4 relative to a centerline C2 of the shaft assembly 700. As a non-limiting example, the helix angle θ4 of the plurality of axially extending increased diameter portion splines 768 is from approximately 0.2° to approximately 0.3°.

According to an embodiment of the disclosure illustrated in FIG. 7A and as a non-limiting example, the plurality of axially extending crash collapse adapter splines 624 on the inner surface 610 of the crash collapse adapter 608 may be orientated at a helix angle θ5 relative to the centerline C2 of the shaft assembly 700. The helix angle θ5 of the plurality of axially extending crash collapse adapter splines 624 is complementary to the helix angle θ4 of the plurality of axially extending increased diameter portion splines 768 on the outer surface 734 of the second increased diameter portion 762 of the first shaft 730. By orienting the plurality of axially extending crash collapse adapter splines 624 at the helix angle θ5 and the plurality of axially extending increased diameter portion splines 768 at the helix angle θ4 the amount of NVH experienced by the vehicle (not shown) when in operation can be reduced. As a non-limiting example, the helix angle θ5 of the plurality of axially extending crash collapse adapter splines 624 is from approximately 0.2° to approximately 0.3°.

An O-ring groove 770 circumferentially extends along at least a portion of the first end portion 764 of the second increased diameter portion 762 of the first shaft 730 of the crash collapse assembly 502. In accordance with the embodiment of the disclosure illustrated in FIG. 7, the O-ring groove 770 is disposed within the plurality of axially extending increased diameter portion splines 768 on the second increased diameter portion 762 of the first shaft 730. The O-ring groove 770 in the outer surface 734 of the second increased diameter portion 762 of the first shaft 730 is of a size and shape to receive and/or retain at least a portion of the O-ring 602.

Circumferentially extending along at least a portion of the outer surface 734 of the second increased diameter portion 762 of the first shaft 730 is a retaining member groove 772. As best seen in FIG. 7 of the disclosure, the retaining member groove 772 is disposed axially outboard from and adjacent to the O-ring groove 770 in the outer surface 734 of the second increased diameter portion 762 of the first shaft 730. The retaining member groove 772 is of a size and shape to receive and/or retain at least a portion of the retaining member 606.

It is within the scope of this disclosure that the shaft assembly 700 may further included the use of one or more vibration reduction devices 774 having an inner surface 776 and an outer surface 778. The one or more vibration reduction devices 774 aid in reducing the overall amount of NVH experienced by the vehicle (not shown) when in operation. In accordance with an embodiment of the disclosure and as a non-limiting example, the inner surface 776 of the one or more vibration reductions devices 774 may be integrally connected to at least a portion of the outer surface 644 of the second shaft 640 and/or to at least a portion of the outer surface 734 of the first shaft 730 of the shaft assembly 700. As a non-limiting example, the one or more vibration reduction devices 774 are a shaft balancing weight, a damper or any other device that is used to balance, align and/or reduce the amount of NVH in a rotating shaft.

When in operation, the substantially cylindrical body portion 720 of the joint assembly 702 will be allowed to slide freely within the hollow portion 740 of the first shaft 730 of the crash collapse assembly 502 while still providing a driving engagement between the second shaft 640 and the second joint member 704. This will allow shaft assembly 700 to absorb a pre-determined amount of the forces exerted onto the shaft assembly 700 when the vehicle (not shown) is in operation.

As illustrated in FIG. 8, when the vehicle (not shown) is in a second position 780 the vehicle (not shown) has experienced a crash condition. When the vehicle (not shown) experiences the crash condition 780 illustrated in FIG. 8, the first shaft 730 is translated axially toward the intermediate portion 710 of the second joint member 704 until at least a portion of the first end portion 736 of the first shaft 730 is in direct contact with at least a portion of the intermediate portion 710 of the second joint member 704. Once the first shaft 730 has come into direct contact with the intermediate portion 710 of the second joint member 704, an amount of force is applied onto the retaining member 606 by the first shaft 730 and/or the crash collapse adapter 608. It is within the scope of this disclosure that the amount of force needed to radially collapse the retaining member 606 into the retaining member groove 772 in the second increased diameter portion 762 of the first shaft 730 is greater than the amount of force exerted on the shaft assembly 700 when the vehicle (not shown) is in normal operation. This will allow the shaft assembly 700 to operate normally until the vehicle (not shown) experiences the crash condition 780 illustrated in FIG. 8 of the disclosure. According to an embodiment of the disclosure and as a non-limiting example, the amount force needed to radially collapse the retaining member 606 into the retaining member groove 772 is from approximately 13 kN to approximately 70 kN. In accordance with an alternative embodiment of the disclosure, the amount force needed to radially collapse the retaining member 606 into the retaining member groove 772 is from approximately 30 kN to approximately 60 kN.

It is within the scope of this disclosure that the amount of force needed to radially collapse the retaining member 606 into the retaining member groove 772 in the second increased diameter portion 762 of the first shaft 730 can be customized by altering an angle θ6 of the second decreasing diameter portion 634 of the crash collapse feature 626, the tolerance or the clearance of the spline connection between the first shaft 730 and the crash collapse adapter 608, the helix angles θ4 and θ5 of the plurality of splines 768 and 624 and the material of the retaining member 606. By taking these factors into consideration, the amount of force needed to collapse the retaining member 606 into the retaining member groove 772 can be customized to meet the needs of any situation. This will allow the shaft assembly 700 disclosed herein to be used in a wide variety of applications.

As previously discussed, the angle θ6 of the second decreasing diameter portion 634 of the crash collapse feature 626 can affect the amount of force needed to radially collapse the retaining member 606 into the retaining member groove 772 in the second increased diameter portion 762 of the first shaft 730. As best seen in FIG. 7 of the disclosure, the angle θ6 of the second decreasing diameter portion 634 of the crash collapse feature 626 in the crash collapse adapter 608 is measured from the centerline C2 of the shaft assembly 700. As the angle θ6 of the second decreasing diameter portion 634 of the crash collapse feature 626 increases, the amount of force needed to radially collapse the retaining member 606 into the retaining member groove 772 decreases. In contrast, as the angle θ6 of the second decreasing diameter portion 634 of the crash collapse feature 626 decreases, the amount of force needed to radially collapse the retaining member 606 into the retaining member groove 772 increases. As a non-limiting example, the angle θ6 of the second decreasing diameter portion 634 of the crash collapse feature 626 is from approximately 30° to approximately 45°.

Additionally, as previously discussed, the tolerance or the clearance of the spline connection between the first shaft 730 and the crash collapse adapter 608 can affect the amount of force needed to radially collapse the retaining member 606 into the retaining member groove 772 in the second increased diameter portion 762 of the first shaft 730. As the tolerance or clearance between the plurality of axially extending increased diameter portion splines 768 on the first shaft 730 and the plurality of axially extending crash collapse adapter splines 624 on the crash collapse adapter 608 increases, the amount of force needed to radially collapse the retaining member 606 into the retaining member groove 772 will increase. In contrast, as the tolerance or clearance between the plurality of axially extending increased diameter portion splines 768 and the plurality of axially extending crash collapse adapter splines 624 decreases, the amount of force needed to radially collapse the retaining member 606 into the retaining member groove 772 will decrease.

Furthermore, as discussed previously, the amount of force needed to collapse the retaining member 606 into the retaining member groove 604 can be altered by changing the helix angle θ4 of the plurality of axially extending increased diameter portion splines 768 on the first shaft 730 and by altering helix angle θ5 of the plurality of axially extending crash collapse adapter splines 624 on the crash collapse adapter 608. As the helix angles θ4 and θ5 of the plurality of splines 768 and 624 increases, the amount of force needed to radially collapse the retaining member 606 into the retaining member groove 772 will increase. In contrast, as the helix angles θ4 and θ5 of the plurality of splines 768 and 624 decreases, the amount of force needed to radially collapse the retaining member 606 into the retaining member groove 772 will decrease.

Once the retaining member 606 has been radially collapsed within the retaining member groove 772 in the second increased diameter portion 762 of the first shaft 730, the first shaft 730, the second joint member 704 and/or the boot assembly 744 will be allowed to translate axially toward the second shaft 640 and into the hollow portion 650 of the second shaft 640. By allowing the first shaft 730, the second joint member 704 and/or the boot assembly 744 to translate axially into the hollow portion 650 of the second shaft 640 the shaft assembly 700 is allowed to absorb an amount of the forces exerted into the shaft assembly 700 when the vehicle (not shown) experiences the crash condition 780. This will prevent the shaft assembly 700 from buckling and injuring vehicle passengers (not shown) when the vehicle (not shown) experiences a crash condition. Additionally, this will prevent the shaft assembly 700 from translating an amount of the forces experienced by the shaft assembly 700 during the crash condition 780 to nearby components (not shown) in the vehicle driveline and damaging those nearby driveline components (not shown). As a result, the crash collapse assembly 502 of the shaft assembly 700 will aid in increasing the overall crash safety rating of the vehicle (not shown).

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A shaft assembly, comprising:
a coupling assembly comprising a first joint member, a second joint member and a third joint member drivingly connecting said first joint member to said second joint member;
wherein said second joint member has a first end portion, a second end portion and an intermediate portion interposed between said first and second end portions of said second joint member;
wherein said second joint member has a substantially cylindrical body portion extending therefrom;
a first shaft having a first end portion, a second end portion and an intermediate portion interposed between said first and second end portions of said first shaft;
wherein at least a portion of said first shaft is drivingly connected to at least a portion of said substantially cylindrical body portion of said second joint member;
wherein said second end portion of said first shaft has an increased diameter portion with a plurality of axially extending increased diameter portion splines circumferentially extend along at least a portion of an outer surface thereof;
wherein a retaining member groove circumferentially extends along at least a portion of said outer surface of said increased diameter portion of said first shaft;
a crash collapse adapter having an inner surface and an outer surface defining a hollow portion therein;
wherein a plurality of axially extending crash collapse adapter splines circumferentially extend along at least a portion of said inner surface of said crash collapse adapter that are complementary to and meshingly engaged with said plurality of axially extending increased diameter portion splines on said outer surface of said increased diameter portion of said first shaft;
wherein a crash collapse feature circumferentially extends along at least a portion of said inner surface of said crash collapse adapter;
wherein said crash collapse feature comprises, in axial order, a first decreasing diameter portion, a substantially cylindrical portion, an increased diameter portion, and a second decreasing diameter portion;
a retaining member;
wherein at least a portion of said retaining member is disposed within said retaining member groove in said outer surface of said increased diameter portion of said first shaft and said increased diameter portion of said crash collapse feature in said inner surface of said crash collapse adapter;
wherein said retaining member radially collapses into said retaining member groove in said outer surface of said increased diameter portion of said first shaft when a pre-determined amount of force is applied to said retaining member;
a flexible boot having a first end portion and a second end portion;
wherein at least a portion of said first end portion of said flexible boot is connected to at least a portion of said substantially cylindrical body portion of said second joint member;
wherein at least a portion of said second end portion of said flexible boot is connected to at least a portion of said first shaft;
a second shaft having an inner surface and an outer surface defining a hollow portion therein; and
wherein at least a portion of a first end portion of said second shaft is drivingly connected to at least a portion of said crash collapse adapter.

2. The shaft assembly of claim 1, wherein said retaining member is one of a snap-ring, a circlip, a C-Clip, and a Seeger ring or a Jesus clip.

3. The shaft assembly of claim 1, wherein said flexible boot has an outermost diameter OD1 that is less than a diameter D1 of said hollow portion of said crash collapse adapter.

4. The shaft assembly of claim 1, wherein a first decreasing diameter portion of said crash collapse feature extends from a first end of said inner surface of said crash collapse adapter;
 wherein an end of said substantially cylindrical portion of said crash collapse feature is connected to an end of said first reducing diameter portion of said crash collapse feature opposite said first end of said crash collapse adapter;
 wherein an end of said increased diameter portion of said crash collapse feature is connected to an end of said substantially cylindrical portion of said crash collapse feature opposite said first decreasing diameter portion of said crash collapse feature; and
 wherein an end of said second decreasing diameter portion of said crash collapse feature is connected to an end of said increased diameter portion of said crash collapse feature opposite said substantially cylindrical portion of said crash collapse feature.

5. The shaft assembly of claim 4, wherein said first decreasing diameter portion of said crash collapse feature has an outermost diameter OD2 that is greater than a diameter D2 of said substantially cylindrical portion of said crash collapse feature;
 wherein said diameter D2 of said substantially cylindrical portion of said crash collapse feature is less than a diameter D3 of said increased diameter portion of said crash collapse feature;
 wherein said second decreasing diameter portion of said crash collapse feature has an inner most diameter ID1 that is substantially equal to a diameter D1 of said hollow portion of said crash collapse adapter; and
 wherein said outermost diameter OD2 of said first decreasing diameter portion, said diameter D2 of said substantially cylindrical portion and said diameter D3 of said increased diameter portion of said crash collapse feature are greater than said diameter D1 of said hollow portion of said crash collapse adapter.

6. The shaft assembly of claim 1, wherein said pre-determined amount of force to radially collapse said retaining member into said retaining member groove is from approximately 30 kN to approximately 60 kN.

7. The shaft assembly of claim 1, wherein said second decreasing diameter portion of said crash collapse feature of said crash adapter has an angle θ3 that is measured from a centerline C1 of said shaft assembly; and
 wherein said angle θ3 of said second decreasing diameter portion of said crash collapse feature is from approximately 30° to approximately 45°.

8. The shaft assembly of claim 1, further comprising one or more vibration reduction devices having an inner surface and an outer surface; and
 wherein at least a portion of said inner surface of said one or more vibration reduction devices are integrally connected to at least a portion of said outer surface of said second shaft or to at least a portion of an outer surface of said substantially cylindrical body portion of said second joint member.

9. The shaft assembly of claim 1, wherein said first shaft further comprises an O-ring groove circumferentially extending along at least a portion of said outer surface of said increased diameter portion of said first shaft;
 wherein at least a portion of an O-ring is disposed within said O-ring groove in said outer surface of said increased diameter portion of said first shaft; and
 wherein at least a portion of said O-ring is in direct contact with at least a portion of said substantially cylindrical portion of said crash collapse feature in said inner surface of said crash collapse adapter.

10. A method of collapsing a shaft assembly, comprising:
 providing a joint assembly comprising a first joint member, a second joint member and a third joint member drivingly connecting said first joint member to said second joint member;
 providing a first shaft drivingly connected to said second joint member, wherein said first shaft has an increased diameter portion with a retaining member groove circumferentially extending along at least a portion of an outer surface of said increased diameter portion;
 providing a crash collapse adapter driving connected to an end of said first shaft opposite said second joint member, wherein said crash collapse adapter has an inner surface and an outer surface defining a hollow portion therein, wherein a crash collapse feature circumferentially extends along at least a portion of said inner surface of said crash collapse adapter, wherein said crash collapse feature comprises, in axial order, a first decreasing diameter portion, a substantially cylindrical portion, an increased diameter portion, and a second decreasing diameter portion;
 providing a retaining member, wherein at least a portion of said retaining member is disposed within said retaining member groove in said outer surface of said increased diameter portion of said first shaft and said crash collapse feature in said crash collapse adapter;
 providing a second shaft drivingly connected to at least a portion of said crash collapse adapter, wherein said second shaft has an inner surface and an outer surface defining a hollow portion therein;
 providing a flexible boot having a first end portion and a second end portion, wherein at least a portion of said first end portion of said flexible boot is connected to at least a portion of said substantially cylindrical body portion of said second joint member, wherein at least a portion of said second end portion of said flexible boot is connected to at least a portion of said first shaft;
 applying a pre-determined amount of force onto said retaining member by said first shaft and/or said crash collapse adapter;
 collapsing said retaining member radially within said retaining member groove in outer surface of said increased diameter portion of said first shaft;
 translating said first shaft and/or said second joint member axially within said hollow portion of said second shaft; and
 absorbing an amount of force experienced by said joint assembly, said first shaft, said crash collapse adapter and said second shaft in a crash condition.

11. The method of collapsing a shaft assembly of claim 10, wherein said pre-determined amount of force is from approximately 30 kN to approximately 60 kN.

12. The method of collapsing a shaft assembly of claim 10, further comprising the steps of:
 providing a plug member at least partially disposed within a hollow portion of a substantially cylindrical body portion of said second joint member of said joint assembly;
 applying an amount of force onto said plug member by said first shaft;
 dislodging said plug member from within said hollow portion of said substantially cylindrical body portion of said second joint member; and allowing said first shaft to translate axially toward said third joint member of said joint assembly.

* * * * *